US010511895B2

(12) United States Patent
DeFaria et al.

(10) Patent No.: US 10,511,895 B2
(45) Date of Patent: Dec. 17, 2019

(54) CINEMATIC MASTERING FOR VIRTUAL REALITY AND AUGMENTED REALITY

(71) Applicant: WARNER BROS. ENTERTAINMENT INC., Burbank, CA (US)

(72) Inventors: Christopher DeFaria, Los Angeles, CA (US); Gregory Gewickey, Los Angeles, CA (US); Michael Smith, Santa Monica, CA (US); Lewis Ostrover, Los Angeles, CA (US)

(73) Assignee: WARNER BROS. ENTERTAINMENT INC., Burbank, CA (US)

( * ) Notice: Subject to any disclaimer, the term of this patent is extended or adjusted under 35 U.S.C. 154(b) by 116 days.

(21) Appl. No.: 15/289,174

(22) Filed: Oct. 8, 2016

(65) Prior Publication Data

US 2017/0105052 A1   Apr. 13, 2017

Related U.S. Application Data

(60) Provisional application No. 62/239,782, filed on Oct. 9, 2015.

(51) Int. Cl.

| H04N 21/81 | (2011.01) |
| H04N 21/422 | (2011.01) |
| H04N 21/214 | (2011.01) |
| H04N 21/2225 | (2011.01) |

(Continued)

(52) U.S. Cl.
CPC ......... *H04N 21/816* (2013.01); *H04N 21/214* (2013.01); *H04N 21/2143* (2013.01); *H04N 21/2225* (2013.01); *H04N 21/422* (2013.01); *H04N 21/42201* (2013.01); *H04N 21/4334* (2013.01); *H04N 21/43615* (2013.01); *H04N 21/8146* (2013.01); *H04N 21/8186* (2013.01)

(58) Field of Classification Search
None
See application file for complete search history.

(56) References Cited

U.S. PATENT DOCUMENTS

| 6,409,599 | B1 | 6/2002 | Sprout et al. |
| 9,011,246 | B1 | 4/2015 | Kier et al. |
| 9,396,588 | B1* | 7/2016 | Li .......................... G06F 3/011 |

(Continued)

OTHER PUBLICATIONS

International Search Report and Written Opinion dated Jan. 19, 2017 for PCT/US2016/056294.

*Primary Examiner* — Ricky Chin
(74) *Attorney, Agent, or Firm* — One LLP; Jonathan Jaech

(57) ABSTRACT

An entertainment system provides data to a common screen (e.g., cinema screen) and personal immersive reality devices. For example, a cinematic data distribution server communicates with multiple immersive output devices each configured for providing immersive output (e.g., a virtual reality output) based on a data signal. Each of the multiple immersive output devices is present within eyesight of a common display screen. The server configures the data signal based on digital cinematic master data that includes immersive reality data. The server transmits the data signal to the multiple immersive output devices contemporaneously with each other, and optionally contemporaneously with providing a coordinated audio-video signal for output via a the common display screen and shared audio system.

18 Claims, 15 Drawing Sheets

(51) Int. Cl.
*H04N 21/433* (2011.01)
*H04N 21/436* (2011.01)

(56) References Cited

U.S. PATENT DOCUMENTS

| | | | |
|---|---|---|---|
| 9,633,692 B1* | 4/2017 | Haselwander | G11B 27/007 |
| 9,679,417 B1* | 6/2017 | Ross | G06T 19/006 |
| 10,078,917 B1* | 9/2018 | Gaeta | G06T 19/006 |
| 2008/0111832 A1* | 5/2008 | Emam | G02B 27/017 |
| | | | 345/633 |
| 2012/0306920 A1 | 12/2012 | Bathiche et al. | |
| 2013/0181901 A1 | 7/2013 | West | |
| 2013/0201215 A1* | 8/2013 | Martellaro | G09G 5/00 |
| | | | 345/633 |
| 2014/0035951 A1* | 2/2014 | Martellaro | G09G 3/003 |
| | | | 345/633 |
| 2014/0105486 A1* | 4/2014 | Tamaazousti | G06T 7/0044 |
| | | | 382/154 |
| 2014/0235311 A1* | 8/2014 | Weising | G09G 5/08 |
| | | | 463/14 |
| 2014/0279458 A1* | 9/2014 | Holman | G06Q 20/227 |
| | | | 705/40 |
| 2014/0357366 A1* | 12/2014 | Koganezawa | G06T 19/006 |
| | | | 463/31 |
| 2015/0002374 A1* | 1/2015 | Erinjippurath | G02B 27/0172 |
| | | | 345/8 |
| 2015/0055937 A1* | 2/2015 | Van Hoff | H04N 13/0014 |
| | | | 386/285 |
| 2015/0243068 A1* | 8/2015 | Solomon | G02B 27/017 |
| | | | 345/419 |
| 2015/0254882 A1 | 9/2015 | Englert et al. | |
| 2015/0286275 A1* | 10/2015 | Huang | G06F 3/011 |
| | | | 345/156 |
| 2016/0025982 A1* | 1/2016 | Sutherland | G02B 27/0172 |
| | | | 359/13 |
| 2016/0042566 A1* | 2/2016 | Mao | G06T 19/006 |
| | | | 463/32 |
| 2016/0093108 A1* | 3/2016 | Mao | A63F 13/42 |
| | | | 345/633 |
| 2016/0189268 A1* | 6/2016 | Gandhi | G06Q 30/0623 |
| | | | 705/26.61 |
| 2016/0189427 A1* | 6/2016 | Wu | G06T 19/006 |
| | | | 345/633 |
| 2016/0260069 A1* | 9/2016 | Holman | G06Q 20/22 |
| 2016/0279516 A1* | 9/2016 | Gupta | A63F 13/5255 |
| 2016/0284131 A1* | 9/2016 | Koga | G06T 19/006 |
| 2016/0286195 A1* | 9/2016 | Lehman | G06T 19/006 |
| 2016/0320833 A1 | 11/2016 | Schuman | G06F 3/147 |
| 2016/0330508 A1* | 11/2016 | Newell | G06Q 50/01 |
| 2016/0366392 A1* | 12/2016 | Raghoebardajal | H04N 19/132 |
| 2017/0072323 A1* | 3/2017 | Malenfant | A63F 13/86 |
| 2017/0078447 A1* | 3/2017 | Hancock | H04L 67/38 |
| 2017/0127117 A1* | 5/2017 | Ayers | H04N 21/4307 |
| 2017/0200316 A1* | 7/2017 | Giordano | G06F 3/012 |
| 2018/0053285 A1* | 2/2018 | Jones | G06T 15/04 |

* cited by examiner

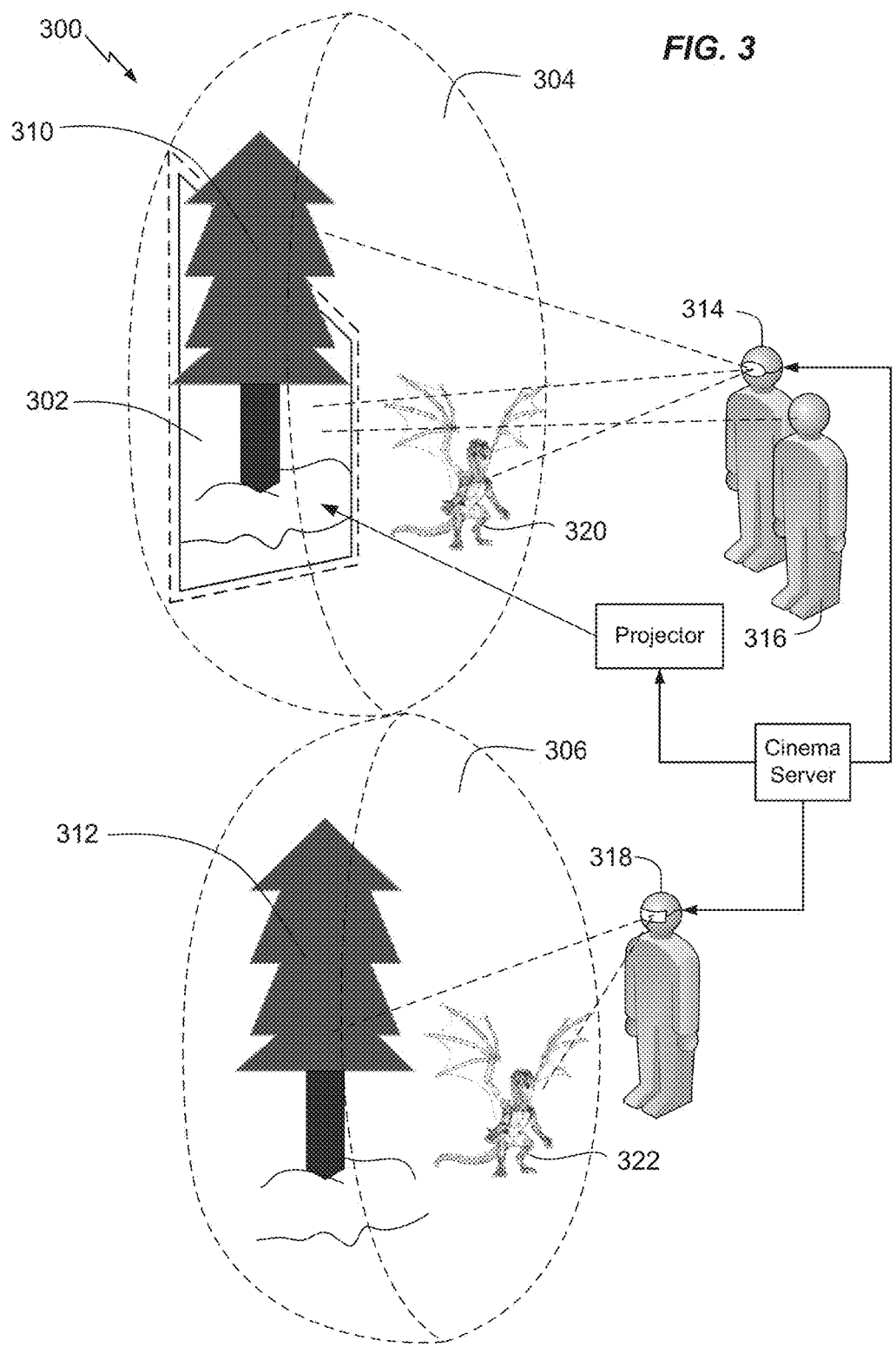

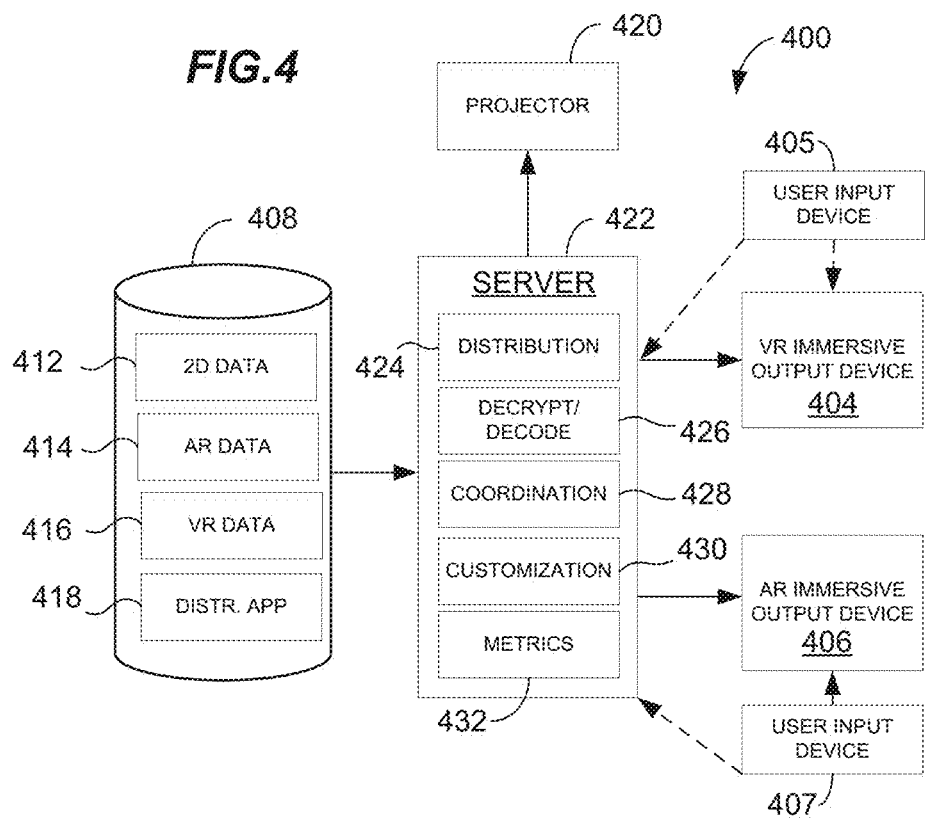
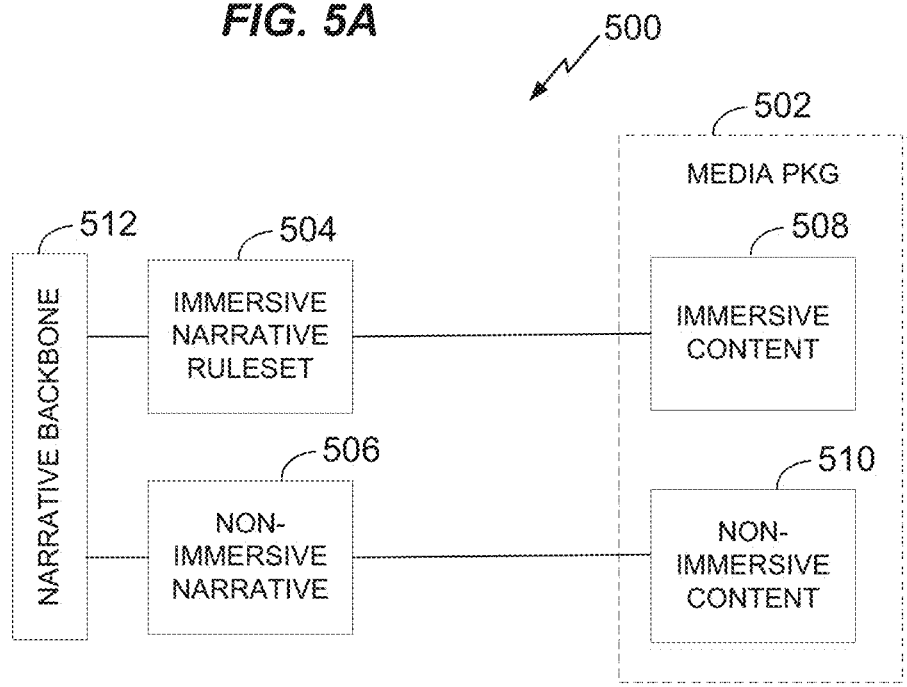

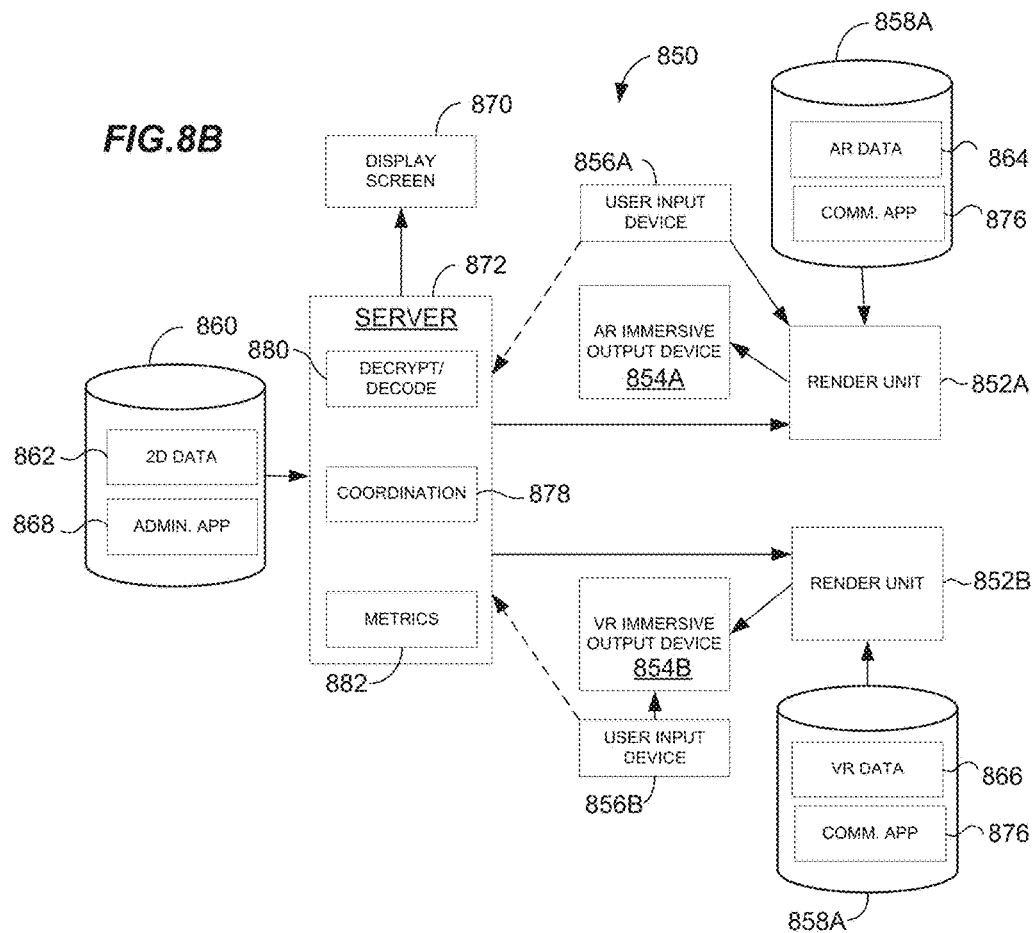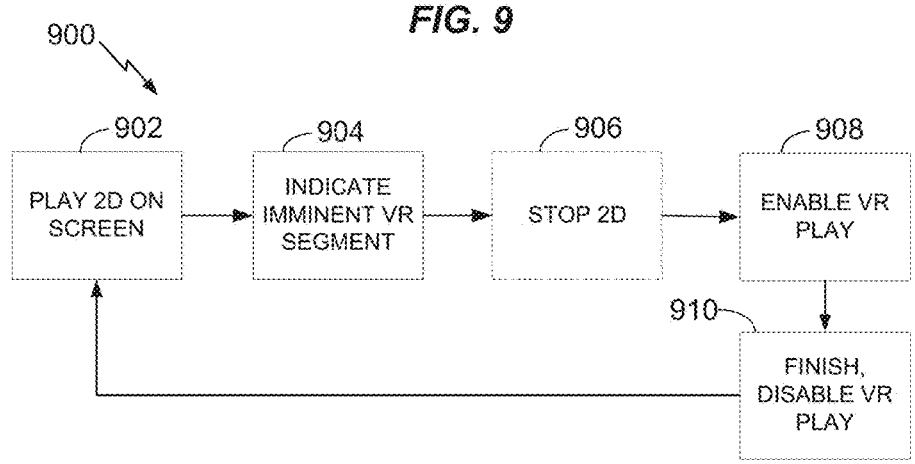

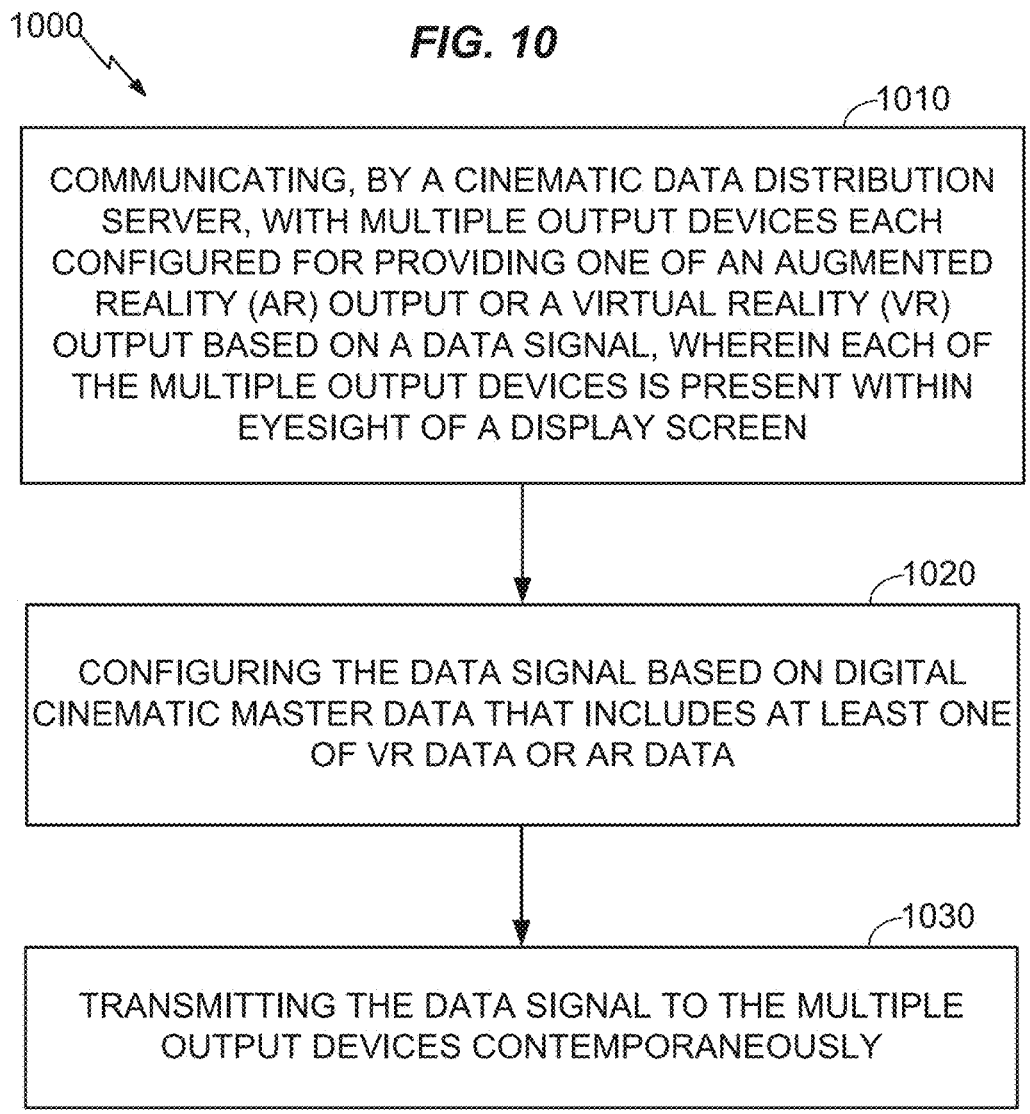

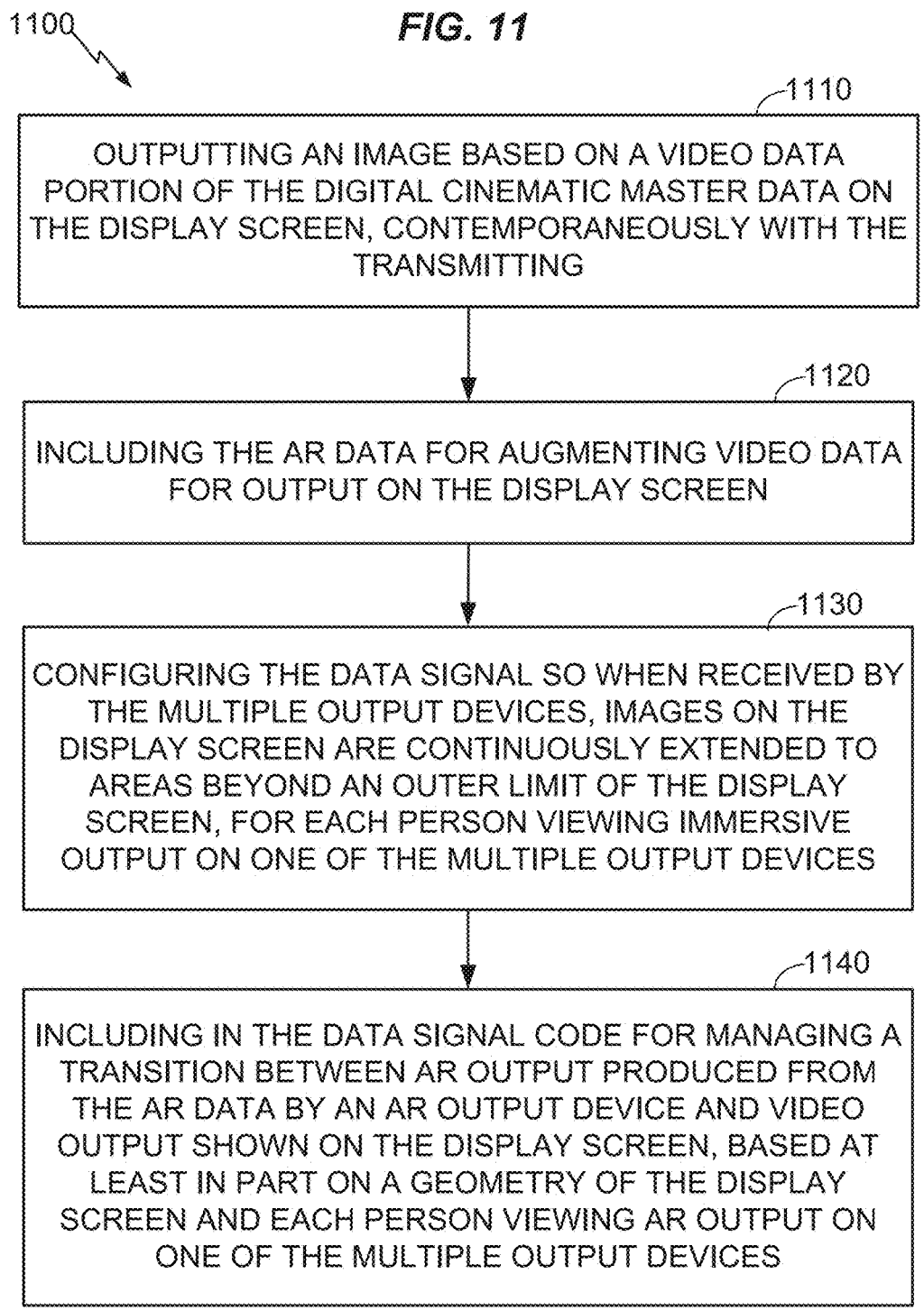

1210 — CONFIGURING THE DATA SIGNAL SO WHEN RECEIVED BY THE MULTIPLE OUTPUT DEVICES, IMAGES THAT DO NOT APPEAR ON THE DISPLAY SCREEN APPEAR AS IF LOCATED IN OR AROUND A NON-SCREEN DISPLAY VOLUME TO EACH PERSON VIEWING IMMERSIVE OUTPUT ON ONE OF THE MULTIPLE OUTPUT DEVICES

1220 — THE IMAGES THAT DO NOT APPEAR ON THE DISPLAY SCREEN APPEAR IN A COORDINATE SYSTEM DEFINED RELATIVE TO THE EACH PERSON VIEWING IMMERSIVE OUTPUT ON ONE OF THE MULTIPLE OUTPUT DEVICES

1230 — THE IMAGES THAT DO NOT APPEAR ON THE DISPLAY SCREEN APPEAR IN A COORDINATE SYSTEM DEFINED RELATIVE TO THE DISPLAY SCREEN

1240 — INCLUDING IN THE DATA SIGNAL CODE ENABLING EACH PERSON VIEWING OUTPUT ON ONE OF THE MULTIPLE OUTPUT DEVICES TO INTERACT WITH AT LEAST ONE OF THE IMAGES, CAUSING IMMERSIVE OUTPUT TO CHANGE

1250 — CHANGING VIDEO OUTPUT SHOWN ON THE DISPLAY SCREEN BASED ON THE EACH PERSON'S INTERACTION WITH AT LEAST ONE OF THE IMAGES

1260 — PROVIDING AN ELECTRONIC RECORD OF A LICENSE RIGHT TO DIGITAL CONTENT TO A USER ACCOUNT DATA STORE ASSOCIATED WITH THE EACH PERSON, BASED THE EACH PERSON'S INTERACTION WITH AT LEAST ONE OF THE IMAGES

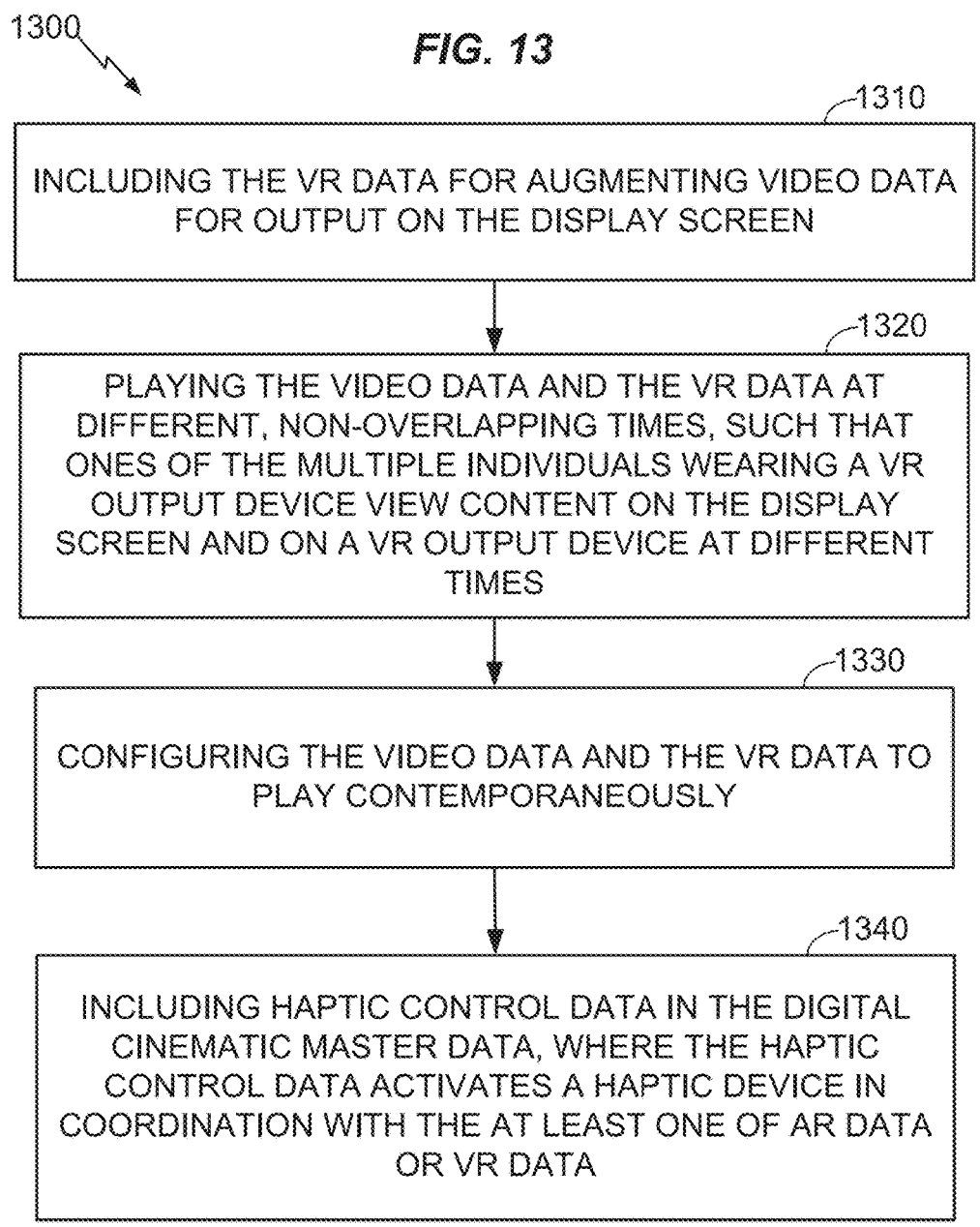

1610
PREPARING THE AR DATA FOR AUGMENTING VIDEO DATA CONFIGURED FOR PROJECTION OR OUTPUT ON THE 2D DISPLAY SCREEN ARRANGED FOR VIEWING BY MULTIPLE INDIVIDUALS

1620
PREPARING THE AR DATA FOR CONTINUOUSLY EXTENDING IMAGES ON THE DISPLAY SCREEN TO AREAS BEYOND AN OUTER LIMIT OF THE DISPLAY SCREEN

1630
PREPARING THE AR DATA FOR CAUSING IIMAGES THAT DO NOT APPEAR ON THE 2D DISPLAY SCREEN APPEAR AS IF LOCATED IN OR AROUND A NON-SCREEN DISPLAY VOLUME TO ANY ONE OF THE MULTIPLE INDIVIDUALS WEARING AN AR OUTPUT DEVICE

1640
PREPARING THE AR DATA SO THAT THE IMAGES APPEAR IN A COORDINATE SYSTEM DEFINED RELATIVE TO EACH OF THE MULTIPLE INDIVIDUALS WEARING AN AR OUTPUT DEVICE

1650
PREPARING THE AR DATA SO THAT THE IMAGES APPEAR IN A COORDINATE SYSTEM DEFINED RELATIVE TO THE DISPLAY SCREEN

```
┌─ 1710
│ INCLUDING IN THE AR DATA CODE FOR ENABLING A USER
│ TO INTERACT WITH AT LEAST ONE OF THE IMAGES,
│ CAUSING THE AR OUTPUT TO CHANGE IN RESPONSE TO
│ USER INPUT
```

```
┌─ 1720
│ CONFIGURING THE CODE SO THAT A USER'S
│ INTERACTION WITH AT LEAST ONE OF THE IMAGES
│ CAUSES THE VIDEO OUTPUT SHOWN ON THE DISPLAY
│ SCREEN TO CHANGE
```

```
┌─ 1730
│ CONFIGURING THE CODE SO THAT A USER'S
│ INTERACTION WITH AT LEAST ONE OF THE IMAGES
│ CAUSES AN ELECTRONIC RECORD OF A LICENSE
│ RIGHT TO DIGITAL CONTENT TO BE PROVIDED TO A
│ USER ACCOUNT DATA STORE ASSOCIATED WITH THE
│ USER
```

```
┌─ 1740
│ INCLUDING HAPTIC CONTROL DATA IN THE DIGITAL
│ CINEMATIC MASTER DATA, WHERE THE HAPTIC
│ CONTROL DATA ACTIVATES A HAPTIC DEVICE IN
│ COORDINATION WITH THE AT LEAST ONE OF AR DATA
│ OR VR DATA
```

CINEMATIC MASTERING FOR VIRTUAL REALITY AND AUGMENTED REALITY

CROSS-REFERENCE TO RELATED APPLICATION

This application claims priority pursuant to 35 U.S.C. § 119(e) to U.S. provisional application Ser. No. 62/239,782 filed Oct. 9, 2015, which is hereby incorporated by reference, in its entirety.

FIELD

The present disclosure relates to the production, configuration, and providing, by a computer, of digital data for virtual reality or augmented reality output.

BACKGROUND

"Virtual reality" is a term that has been used for various types of content that simulates immersion in a three-dimensional (3D) world, including, for example, various video game content, and animated film content. In some types of virtual reality, a user can navigate through a simulation of a 3D environment generated based on the computer model, by controlling the position and orientation of a virtual camera that defines a viewpoint for a 2D scene that is displayed on a two-dimensional display screen. A variation of these technologies is sometimes called "augmented reality." In an augmented reality setup, the display technology shows a combination of the user's surroundings that is "augmented" by one or more digital objects or overlays. Augmented reality content may be as simple as textual "heads up" information about objects or people visible around the user, or as complex as transforming the entire appearance of the user's surroundings into a fantasy environment that corresponds to the user's real surroundings.

Virtual reality (VR) and augmented reality (AR) have been applied to various types of immersive video stereoscopic presentation techniques including, for example, stereoscopic virtual reality headsets. Headsets and other presentation methods immerse the user in a 3D scene. Lenses in the headset enable the user to focus on a lightweight split display screen mounted in the headset only inches from the user's eyes. Different sides of the split display show right and left stereoscopic views of video content, while the user's peripheral view is blocked. In another type of headset, two separate displays are used to show different images to the user's left eye and right eye respectively. In another type of headset, the field of view of the display encompasses the full field of view of eye including the peripheral view. In another type of headset, an image is projected on the user's retina using controllable small lasers, mirrors or lenses. Either way, the headset enables the user to experience the displayed virtual reality content more as if the viewer were immersed in a real scene. In the case of augmented reality (AR) content, the viewer may experience the augmented content as if it were a part of, or placed in, an augmented real scene.

These immersive effects may be provided or enhanced by motion sensors in the headset that detect motion of the user's head, and adjust the video display(s) accordingly. By turning his head to the side, the user can see the virtual reality scene off to the side; by turning his head up or down, the user can look up or down in the virtual reality scene. The headset may also include tracking sensors that detect position of the user's head and/or body, and adjust the video display(s) accordingly. By leaning or turning, the user can see the virtual reality scene from a different point of view. This responsiveness to head movement, head position and body position greatly enhances the immersive effect achievable by the headset. The user may be provided the impression of being placed inside or "immersed" in the virtual reality scene. As used herein, "immersive" generally encompasses both VR and AR.

Immersive headsets and other wearable immersive output devices are especially useful for game play of various types, which involve user exploration of a modelled environment generated by a rendering engine as the user controls one or more virtual camera(s) using head movement, the position or orientation of the user's body, head, eye, hands, fingers, feet, or other body parts, and/or other inputs. To provide an immersive experience, the user needs to perceive a freedom of movement that is in some way analogous to human visual perception when interacting with reality. Content produced for VR can provide this experience using techniques for real-time rendering that have been developed for various types of video games. The content is may be designed as a three-dimensional computer model with defined boundaries and rules for rendering as video output. This content can be enhanced by stereoscopic techniques to provide stereoscopic output, sometime referred to as "3D," and associated with a VR application that manages the rendering process in response to movement of the VR headset, to produce a resulting VR experience. The user experience is very much like being placed inside a rendered video game.

In other types of VR and AR, the simulated 3D environment may be used primarily to tell a story, more like traditional theater or cinema. In this type of VR or AR, the added visual effects may enhance the depth and richness of the story's narrative elements or special effects, without giving the user full control (or any control) over the narrative itself. However, the technology for experiencing anything similar to cinematic content delivered using VR or AR equipment or methods is in a very early stage of development. Actual implementations of technology are quite limited, and users have thus far been largely or completely untouched by VR or AR in their experience of narrative content.

It would be desirable, therefore, to develop new methods and other new technologies for mastering cinematic content for VR and AR use, that overcome these and other limitations of the prior art and enhance the appeal and enjoyment of narrative content for new immersive technologies such as VR and AR.

SUMMARY

This summary and the following detailed description should be interpreted as complementary parts of an integrated disclosure, which parts may include redundant subject matter and/or supplemental subject matter. An omission in either section does not indicate priority or relative importance of any element described in the integrated application. Differences between the sections may include supplemental disclosures of alternative embodiments, additional details, or alternative descriptions of identical embodiments using different terminology, as should be apparent from the respective disclosures.

In an aspect of the disclosure, a computer-implemented method includes communicating, by a cinematic data distribution server over a wireless network, with multiple immersive output devices each configured for providing one of an augmented reality (AR) output or a virtual reality (VR) output based on a data signal, wherein each of the multiple immersive output devices is present within eyesight of a display screen. For example, the multiple immersive output devices may be worn by moviegoers or home theater users. The method may include configuring the data signal based on digital cinematic master data that includes at least one of VR data or AR data, for example in ways as summarized below and described elsewhere herein. The method may include transmitting the data signal to the multiple immersive output devices contemporaneously, such that each of the users receives and processes the data and shares a contemporaneous immersive video experience.

In another aspect, the method may include outputting an image based on a video data portion of the digital cinematic master data on the display screen, contemporaneously with the transmitting. The users may thereby enjoy an AR experience in addition to the video on the screen, or if using fully VR equipment that obscures the screen, may enjoy a cinematic presentation that both supplements and duplicates the presentation on the screen.

For serving AR immersive output devices, the configuring the data signal may include encoding the AR data for augmenting video data for output on the display screen, and including the AR data with the video data in the data signal. The AR data may be configured to provide various effects. In an aspect, the AR data, when received by the multiple immersive output devices, continuously extends images on the display screen to areas beyond an outer limit of the display screen, for each person viewing AR output on one of the multiple immersive output devices. For example, a person wearing an AR immersive output device may see elements of the scene that extend upwards, downwards, or sideways beyond the frame. In another, alternative aspect, the AR data, when received by the multiple immersive output devices causes images that do not appear on the display screen to appear in a non-screen display volume to each person viewing AR output on one of the multiple immersive output devices. For example, the non-screen object may be caused to appear in front of, above, or below the display screen, or even behind the viewer. These effects may similarly be provided by configuring VR data for a VR output device.

The data signal may be configured to provide each user with an "objective" experience, a "subjective" experience, or a mixture of objective and subjective experiences. To provide a subjective experience, the cinematic data distribution server configures the data signal such that the images that do not appear on the display screen (i.e., the images that are visible only using an AR or VR output device) appear in a coordinate system defined relative to the each person viewing AR or VR output on one of the multiple immersive output devices. To provide an objective experience, the cinematic data distribution server configures the data signal such that the images that do not appear on the display screen appear in the same coordinate system defined relative to the display screen, or in other words, a coordinate system that is relative to the cinema or home theater and the same for all immersive output devices. To provide a mixed experience the cinematic data distribution server configures the data signal such that at least one visible object is defined individually relative to each person's subjective coordinate system, while at least one other object is defined in the common coordinate system and is the same for all viewers.

In another aspect, a user may be able to interact with objects depicted in AR or VR output. Accordingly, the method may include providing in the AR data or VR data code enabling each person viewing AR output on one of the multiple immersive output devices to interact with at least one of the images, causing the AR output or VR output to change. In a related aspect, the method may include changing video output shown on the display screen based on the each person's interaction with at least one of the images. For example, different versions of a scene may be provided in stored cinematic data, and the version selected at runtime may be selected based on an aggregate of feedback from the different users. In another related aspect, the method may include providing an electronic record of a license right to digital content to a user account data store associated with the each person, based the each person's interaction with at least one of the images. For example, by interacting with an object or character during a cinematic presentation using an AR or VR device, a viewer may "earn" the right to use the object, character, or some related object or character in another application, such as, for example, a video game application or social media application. In some embodiments, the data store may be, or may include, a computer memory in an AR or VR output device worn by the each person.

In another aspect, the method may include provided in the AR data code for managing a transition between AR output produced from the AR data by an AR output device and video output shown on the display screen, based at least in part on a geometry of the display screen and each person viewing AR output on one of the multiple immersive output devices. Accordingly, a viewer wearing an AR device may be able to view images on the display screen and images output by the AR device simultaneously, without any distracting break or disruption between the display screen image and surrounding AR images.

In another aspect, the method may include providing the VR data for augmenting video data for output on the display screen, for example by playing the video data and the VR data at different, non-overlapping times, such that ones of the multiple individuals wearing a VR output device view content on the display screen and on a VR output device at different times. The video data and the VR data may also be configured to play contemporaneously. The video data may be, or may include, two-dimensional non-stereoscopic frame data, stereoscopic frame data, or both.

In another aspect, the method may include providing haptic control data in the digital cinematic master data, where the haptic control data activates a haptic device in coordination with the at least one of augmented AR data or VR data.

In a related method, a computer or network of connected computers may be used for configuring digital cinematic master data that includes at least one of AR data or VR data for providing one of an AR output or a VR output comprising a cinematic presentation; and recording the digital cinematic master data in a non-transitory computer-readable medium. The configuring may include operations for providing the output effects summarized above. For example, the configuring may include: preparing the AR or VR data for augmenting video data configured for projection or output on a display screen arranged for viewing by multiple individuals; preparing the AR or VR data for continuously extending images on the display screen to areas beyond an outer limit of the display screen; preparing the AR or VR data for causing images that do not appear on the display screen to appear between the display screen and any one of the multiple individuals wearing an immersive output device (or above, below, behind); or preparing the AR or VR data so that the images provide a subjective experience, an objective experience, or a mixed subjective and objective experience.

The method may include providing executable instructions ("code") in the AR or VR data for enabling a user to interact with at least one of the images, causing the AR output to change in response to user input. The method may include configuring the code so that a user's interaction with at least one of the images causes the video output shown on the display screen to change. The method may include configuring the code so that a user's interaction with at least one of the images causes an electronic record of a license right to digital content to be provided to a user account data store associated with the user.

Any of the foregoing methods may be implemented in any suitable programmable computing apparatus, by provided program instructions in a non-transitory computer-readable medium that, when executed by a computer processor, cause the apparatus to perform the described operations. An apparatus may include a computer or set of connected computers that is used in video production or is installed in a cinema or home theater. Other elements of the apparatus may include, for example, a display screen, an audio output device, and a user input device, which participate in the execution of the method. An apparatus may include a virtual reality device, such as a headset or other display that reacts to movements of a user's head or body to provide the impression of being placed inside of the rendered scene in which the game is played.

To the accomplishment of the foregoing and related ends, one or more examples comprise the features hereinafter fully described and particularly pointed out in the claims. The following description and the annexed drawings set forth in detail certain illustrative aspects and are indicative of but a few of the various ways in which the principles of the examples may be employed. Other advantages and novel features will become apparent from the following detailed description when considered in conjunction with the drawings and the disclosed examples, which encompass all such aspects and their equivalents.

BRIEF DESCRIPTION OF THE DRAWINGS

The features, nature, and advantages of the present disclosure will become more apparent from the detailed description set forth below when taken in conjunction with the drawings in which like reference characters identify like elements correspondingly throughout the specification and drawings.

FIG. 3 is a schematic diagram illustrating aspects of viewing coordinated immersive and non-immersive content from the perspective of different viewers.

FIG. 4 is a concept diagram illustrating elements of a system for outputting immersive content to multiple users in a cinema or home theater setting.

FIG. 5A is a block diagram illustrating aspects of a media package holding audio-video data with a predetermined narrative with additional content coordinated with the pre-defined narrative and configured for providing an alternative output.

FIG. 8B is a concept diagram illustrating elements of a system for coordinating immersive content provided to multiple users in a cinema or home theater setting.

FIG. 9 is a flow chart illustrating elements of serving VR or AR data to a user of a cinema or home theater non-contemporaneously with two-dimensional (2D) data for display on a screen or the like.

FIG. 10 is a flow chart illustrating a method for serving VR or AR data to an AR or VR output device providing a cinema experience.

FIGS. 11-13 are flow charts illustrating further optional aspects or operations of the method diagrammed in FIG. 10.

FIGS. 16-17 are flow charts illustrating further optional aspects or operations of the method diagrammed in FIG. 15.

DETAILED DESCRIPTION

Various aspects are now described with reference to the drawings. In the following description, for purposes of explanation, numerous specific details are set forth in order to provide a thorough understanding of one or more aspects. It may be evident, however, that the various aspects may be practiced without these specific details. In other instances, well-known structures and devices are shown in block diagram form in order to facilitate describing these aspects.

Figure 1:
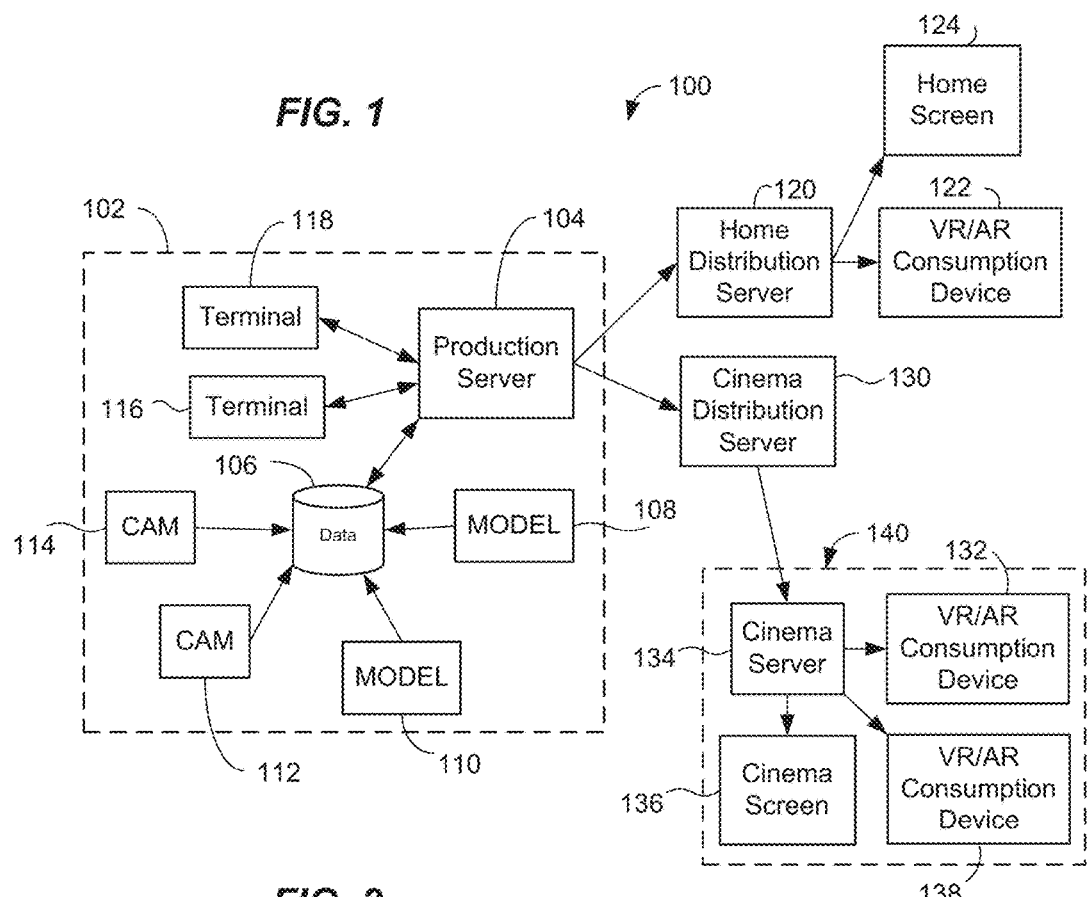
FIG. 1 is a schematic block diagram illustrating aspects of a system and apparatus for the production and configuration of digital data for virtual reality or augmented reality output coupled to a distribution system.

An illustrative system 100 for production and distribution of immersive content (e.g., AR and VR) in coordination with non-immersive content (e.g., 2D video with audio, stereoscopic 3D video with audio, non-immersive video games) is shown in FIG. 1. The system 100 may include a set 102 of production activities that produce assets that are shared and used in different ways across related different versions (immersive and non-immersive) of underlying creative content. Creative content includes, for example, video data collected by various camera systems 112, 112, audio data collected and/or generated by audio subsystems (not shown), and computer modeling/animation data created and arranged from various modeling/animation subsystems 108, 110. Creative content may be stored in a data store 106. It should be appreciated that the system may include several different data stores (not shown). A production server component 104, which may comprise a family of production applications operating over a computer network, may access data in the data store 106 under control of various production staff controlling the production process via multiple access terminals 118, 116. The number of components shown in system 100 is merely illustrative. It should be appreciated that a typical feature film or other studio production system will typically include a much larger number of components than illustrated. Creative and technical directors oversee the assembly of creative content from the various data sources, configured for immersive output devices and more traditional non-immersive devices.

Digital content produced by the system may include various versions of the same story, for example, a 2D theater version; a 2D home theater version; a mobile device version; stereoscopic 3D version for one or more of theater, home or mobile devices, a VR version for an in-theater experience, optionally in conjunction with supporting 2D or stereoscopic 3D content, a VR version for home use, likewise optionally for use with non-immersive content; an AR version for supplementing non-immersive content in a theater, an AR version for supplementing non-immersive content in a home theater environment or in a mobile device format, and video game content in one or more of the foregoing output formats. Finished productions in each of the various versions may be provided to a home distribution server 120 which may store the different versions in a content data store (not shown) in association with metadata for managing use and distribution. A least one set of consumers may receive multiple versions of immersive and non-immersive content in a single digital content (media) package, whether stored under control of a network served 120, or locally on a computer-readable medium such as an optical disc or memory device.

Different distribution channels each assigned its own server resources may be used to provide content to different sets of end users. For example, a cinema distribution server 130 may distribute immersive and conventional content to cinemas for public performance. For illustrative clarity, one cinema 140 of potentially many cinemas is diagrammed. Each cinema 140 may include its own server 134 used to distribute digital content to one or more theaters each hosting a performance. Each theater (or the theater, if only a single theater is served by the server 143) includes a cinema screen 136 and one or more viewers each wearing an immersive content consumption device, 132, 138, for example, a VR visor or AR headset. The same underlying audio-video program may thereby be distributed in different versions for home and cinema use. Both home and cinema versions may include technical elements that coordinate different immersive devices contemporaneously playing the audio-video program in an immersive format. In addition, both versions may include elements that coordinate play of immersive content with contemporaneous or non-contemporaneous content playing In some embodiments, a media package holding coordinated immersive and non-immersive content may be, or may include, a single computer-readable medium (for example, an optical disc medium or FLASH memory device) in which packaged digital content is stored together. Distribution of a non-transitory, tangible and portable storage medium may reduce network bandwidth demands and ensure reliable and seamless access to dense digital content by the consumption device. In some embodiments, rapid distribution to tangible media may be accomplished by distribution from selected kiosks holding electronic copies of digital content for writing to digital copies. In an alternative, such kiosks may take advantage of high-bandwidth connections to obtain the electronic content for distribution. In other embodiments, including for example for cinema distribution, the electronic content may be transmitted over a communications network and/or computer network and stored directly on a memory device or medium connected to or integrated with a client device that will participate in playback of the received content.

Figure 2:
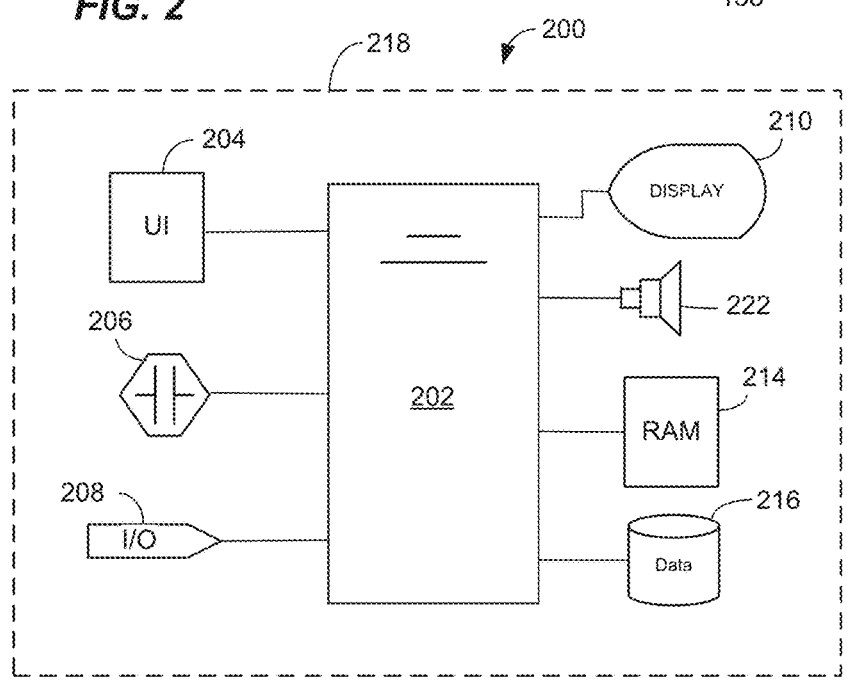
FIG. 2 is a schematic block diagram illustrating more detailed aspects of an apparatus for outputting virtual reality or augmented reality content.

Referring to FIG. 2, aspects of a content consumption device 200 for consuming VR or AR content are illustrated. Several viewers of a home theater or cinema presentation may be equipped with the content consumption device. The apparatus 200 may include, for example, a processor 202, for example a central processing unit based on 80×86 architecture as designed by Intel™ or AMD™, a system-on-a-chip as designed by ARM™, or any other suitable microprocessor. The processor 202 may be communicatively coupled to auxiliary devices or modules of the 3D environment apparatus 200, using a bus or other coupling. Optionally, the processor 202 and some or all of its coupled auxiliary devices or modules (examples of which are depicted at 204-216) may be housed within or coupled to a housing 218, for example, a housing having a form factor of a personal computer, gaming console, smart phone, notepad computer, laptop computer, set-top box, wearable googles, glasses, or visors, or other form factor.

A user interface device 204 may be coupled to the processor 202 for providing user control input to an immersive content display process operated by a VR or AR immersive display engine executing on the processor 202. User control input may include, for example, selections from a graphical user interface or other input (e.g., textual or directional commands) generated via a touch screen, keyboard, pointing device (e.g., game controller), microphone, motion sensor, camera, or some combination of these or other input devices. Control input may also be provided via a sensor 206 coupled to the processor 202. A sensor may comprise, for example, a motion sensor (e.g., an accelerometer), a position sensor, a temperature sensor, a location sensor (for example, a Global Positioning System (GPS) receiver and controller), an eye-tracking sensor, or a microphone. The sensor 206 may detect a motion or other state of a user interface display, for example, motion of a virtual-reality headset, or the bodily state of the user, for example, skin temperature or pulse.

The device 200 may optionally include an input/output port 208 coupled to the processor 202, to enable communication between a VR/AR engine and a computer network, for example a cinema content server or home theater server. Such communication may be used, for example, to enable multiplayer VR or AR experiences, including but not limited to shared immersive experiencing of cinematic content. The system may also be used for non-cinematic multi-user applications, for example social networking, group entertainment experiences, instructional environments, video gaming, and so forth.

A display 220 may be coupled to the processor 202, for example via a graphics processing unit (not shown) integrated in the processor 202 or in a separate chip. The display 210 may include, for example, a flat screen color liquid crystal (LCD) display illuminated by light-emitting diodes (LEDs) or other lamps, a projector driven by an LCD display or by a digital light processing (DLP) unit, a laser projector, or other digital display device. The display device 210 may be incorporated into a virtual reality headset or other immersive display system. Video output driven by a VR/AR immersive display engine operating on the processor 202, or other application for coordinating user inputs with an immersive content display and/or generating the display, may be provided to the display device 210 and output as a video display to the user (also referred to herein as the "player"). Similarly, an amplifier/speaker or other audio output transducer 222 may be coupled to the processor 202 via an audio processing system. Audio output correlated to the video output and generated by the VR/AR display engine or other application may be provided to the audio transducer 222 and output as audible sound to the user.

The 3D environment apparatus 200 may further include a random access memory (RAM) 214 holding program instructions and data for rapid execution or processing by the processor during controlling a 3D environment. When the device 200 is powered off or in an inactive state, program instructions and data may be stored in a long-term memory, for example, a non-volatile magnetic, optical, or electronic memory storage device 216. Either or both of the RAM 214 or the storage device 216 may comprise a non-transitory computer-readable medium holding program instructions, that when executed by the processor 202, cause the device 200 to perform a method or operations as described herein. Program instructions may be written in any suitable high-level language, for example, C, C++, C#, or Java™, and compiled to produce machine-language code for execution by the processor. Program instructions may be grouped into functional modules, to facilitate coding efficiency and comprehensibility. It should be appreciated that such modules, even if discernable as divisions or grouping in source code, are not necessarily distinguishable as separate code blocks in machine-level coding. Code bundles directed toward a specific type of function may be considered to comprise a module, regardless of whether or not machine code on the bundle can be executed independently of other machine code. In other words, the modules may be high-level modules only.

Immersive content may be played with non-immersive content in cinema and home theater settings, to augment conventional content that is displayed on a 2D screen and viewed using no equipment at all or stereoscopic viewing glasses. FIG. 3 illustrates aspects of augmented content using AR or VR in a viewing space 300 shared by multiple users 314, 316 and 318. A first user 314 wearing an AR headset views a content object 310 ("tree") partially on the screen 302 and partially in an augmented view volume 304 surrounding the screen 302. A second user 316 is viewing the screen 302 with "naked eyes" and no equipment, and sees only the partial view of the object 310 as depicted on the screen 302. The second user 316 sees nothing except the actual physical surroundings (e.g., a movie theater or room) in the area surrounding the screen 302.

A third user 318 using a VR headset does not see the screen 302 at all. Instead, the third user sees an equivalent content object 312 for the object 310 displayed in the screen 302. The object 312 may be located in the user's VR space 306 in a position relative to the user 318 that is closely equivalent to the position of the object 310 relative to the users 314, 316 (i.e., subjectively placed). Hence, all users 314, 316 and 318 may share the experience of at least the content playing on the screen 302, while users 314 and 318 equipped with AR or VR output devices can enjoy enhanced content at the same time that non-equipped user 316 is matching content on the screen 302 only. Both the AR-equipped user 314 and the VR-equipped user 318 may view objects that appear in front of, above, below, or to a side of the screen. For example, the AR-equipped user 314 may see the dragon 320, while the VR-equipped user 318 sees an equivalent dragon 322. Each user sees the immersive-only objects 320, 322 in their own frame of reference, in the illustrated example, referred to herein as subjective display.

Coordinating output on a 2D screen with VR output may seem unnecessarily duplicative, but does provide several benefits which are not immediately apparent. For example, VR-equipped or AR-equipped audience members and non-equipped audience members can share a viewing experience together, increasing opportunities for social interaction before, during and after the shared experience. In addition, members of the audience who find the VR experience too emotionally intense or experience unpleasant sensations such as vertigo can temporarily remove their headsets without interrupting their viewing of the story. In alternative, or in addition, the VR or AR headset may be equipped to easily switch between immersive and non-immersive mode without interrupting play. However, such switching will not address all reasons why a user may wish to remove immersive gear during a performance. Audience members may desire to temporarily remove their headsets for other reasons, such as to interact with another audience member, enjoy a snack, adjust a fitting, relieve themselves of the head weight, cool their heads, or to walk to the restroom or concession stand, while following the action on the 2D screen.

Yet another benefit to theater owners is the ability to accommodate different tiers of ticket prices within the same facility. Currently, for example, audiences paying higher ticket prices to enjoy stereoscopic 3D content must be accommodated in a different theater than those paying lower prices to enjoy 2D content, requiring expensive duplication of physical facilities. In a coordinated 2D/AR/VR system, a theater operator can implement tiered pricing for viewing content in the same viewing room. For example, the operator may charge a basic ticket price for access to the theater, a separate fee for connecting a patron's AR/VR equipment to the theater's immersive data stream, and another separate fee for renting AR/VR equipment to patrons who do not bring their own equipment.

Referring to FIG. 4, a system 400 for providing immersive and non-immersive content is illustrated in block form. Elements of the system 400 include a data source 408, coupled to a data distribution server 422. In a cinema or home theater application, one or more immersive output devices, for example a VR output device 404 and an AR output device 406 (each being an example of an "immersive output device"), are in communication with the server 422. Each immersive output device may be coupled to a corresponding user input device 405, 407. The user input devices 405, 407 may include one or more position, orientation, or motion sensors coupled to a user's body, and/or a control panel operable by user manipulation or other bodily input. Information derived from such sensors may be provided to components of the server 422. Contemporaneously with providing data streams to the immersive output devices 404, 406, the server 422 may also provide a data stream to a projector 420 or other 2D display device, for example an electronic display screen.

Data of various types may be obtained by the server 422 from the data source 408. These types may include 2D data 412 for example a digital video file or streaming feed, audio data (not shown), AR data 414 for augmenting the 2D data using an AR output device 406, VR data 416 for providing a parallel or supplemental entertainment experience using a VR output device 404, and a distribution application 418 for managing distribution of the aforementioned data from the server 422. The server 422 may execute the application 418, which when executed may provide various functional modules. The modules may include a distribution module 424 for managing communication with and distribution to multiple immersive output devices. The modules may include a decryption and decoding module 426 for managing content security and providing streaming data in a device-useable form. The modules may include a content coordination module 428 for maintaining coordination between entertainment content streamed to different immersive output devices, a customization module 430 for enabling content to be customized for a particular immersive output device, for example in the case of interactive content. The modules may include a metrics module 432 for collecting feedback from immersive output devices 404, 406, which may be anonymized and used to analyze use patterns with the aim of providing more effective and compelling content for immersive output, for tracking user preferences, or other purposes.

Narrative content represented by, for example, a motion picture script, may be produced for both immersive and non-immersive output devices. Referring to FIG. 5A, general aspects 500 of packaging immersive and non-immersive content in a media package 502 are illustrated. The media package 502 may be, or may include, a particular article, such as computer-readable optical disk or memory device. In the alternative, the package 502 may be, or may include, a set of data maintained on a server for which access rights are granted to a particular user account. In either case, the combining of immersive and non-immersive content as exemplified by the media package 502 is designed to appeal to a consumer desiring to obtain access to immersive content 508 and non-immersive content 510 on different devices, whether at home or in a public theater. For example, the consumer may desire to watch non-immersive content 510 on a video display screen of a mobile or larger device, and immersive content 508 using a head set or other device that provides access to VR or AR content.

The non-immersive content 510 may be recorded according to a non-immersive narrative 506, for example, a traditional script. The immersive content 508 may be recorded according to an immersive narrative ruleset 504, such as, for example, a branching narrative of some kind, or in the alternative, the same script as the non-immersive content. Both the immersive narrative ruleset 504 and the non-immersive narrative 506 may be an expression of a narrative backbone. For example, the narrative backbone may include the entire narrative ruleset 504, while the non-immersive narrative 506 may be a subset of the backbone 512, containing only selected critical narrative events arranged in a particular narrative sequence.

Figure 5B:
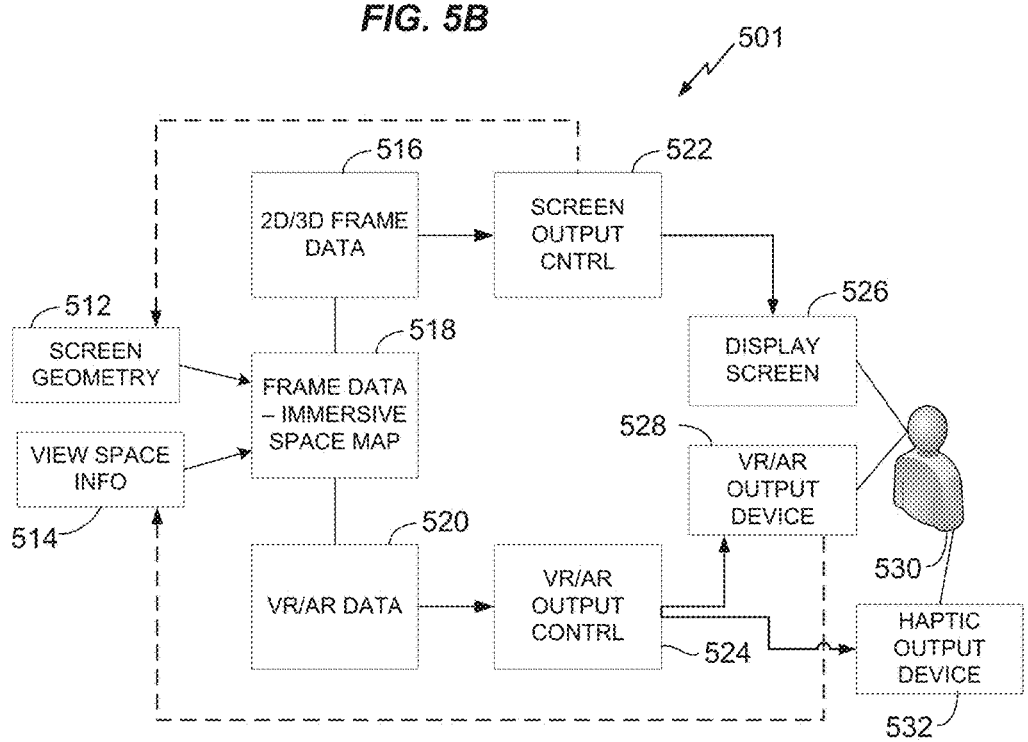
FIG. 5B is a block diagram illustrating aspects of a content display system including coordinated output of immersive and non-immersive content.

In an aspect, immersive content 508 and non-immersive content 510 may be coordinated for consumption by playback in parallel. FIG. 5B illustrates aspects of parallel consumption 501 using coordinated output devices. The different output devices may obtain content from common source, for example from a content server via a local area network or wireless local area network in a cinema or home theater. A first output device for non-immersive content may include a 2D display screen 526. A second output device 528 (immersive output device) may be configured for providing AR or VR. The different output devices 526, 528 may be in use by the same user 530, or by different users (not shown) occupying a shared space.

A data source may supply at least three types of data from a media package: 2D or stereographic 3D frame data 516, VR or AR data 520, and a map 518 that relates the frame data 516 and the VR/AR data 520. Use of the map 518 may change as a function of screen geometry data 512 from the screen output controller 522, and geometry data defining the view space 514, for example a position and orientation of the viewer 530 relative to the display screen 526 from sensors in the VR/AR output device 528. The screen output controller 522 may play frame data in a conventional fashion for output on the display screen 526. While viewing the output on the display screen 526, the user may also view output on the VR/AR device 528. In a VR mode, the immersive output device 528 may duplicate the view on the screen 526 and add additional surrounding imagery and interactive content. In an AR mode, the immersive output device 528 may augment the display 526 with surrounding imagery or interactive content. Using VR or AR content keyed to non-immersive content in a media package, a suitably equipped user can thus greatly expand the viewing area and number of interactive objects that can be experienced in connection with the narrative content, relative to the content displayed on the display screen 526. The VR/AR output controller 524 may keep the VR or AR output synchronized with play of the frame data 516, via the map 518 and geometry data 512, 514. The VR/AR output controller 524 may also generate signals for controlling a haptic output device 532, for example, an oscillator or pneumatically-activated pressure reservoir.

Figure 6:
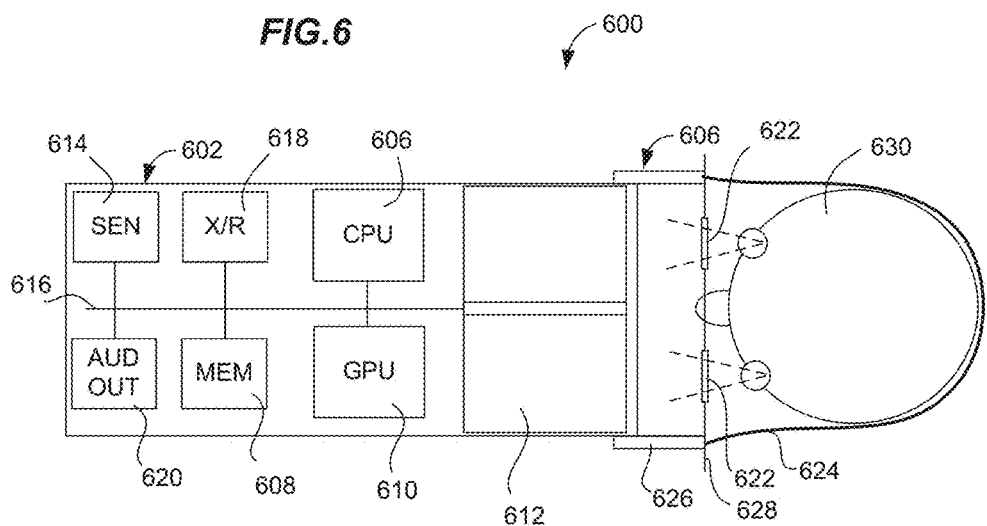
FIG. 6 is a schematic diagram illustrating components of a stereoscopic display device for providing an immersive VR experience.

Any of the features described herein may be executed by an application for providing a 3D environment responsive to user input that produces VR output for an immersive VR headset or the like. FIG. 6 is a diagram illustrating one type of an immersive VR stereoscopic display device 600 may be provided in various form factors, of which device 600 provides but one example. The innovative methods, apparatus and systems are not necessarily limited to a particular form factor of immersive VR display, but may be used in a video immersive output device that enables the user to control a position or point of view of video content playing on the device. Likewise, a VR or AR output device may manage an audio position or point of view of audio content playing on the device. The immersive VR stereoscopic display device 600 represents an example of a relatively low-cost device designed for consumer use.

The immersive VR stereoscopic display device 600 may include a tablet support structure made of an opaque lightweight structural material (e.g., a rigid polymer, aluminum or cardboard) configured for supporting and allowing for removable placement of a portable tablet computing or smartphone device including a high-resolution display screen, for example, an LCD display. This modular design may avoid the need for dedicated electronic components for video output, greatly reducing the cost. The device 600 is designed to be worn close to the user's face, enabling a wide field of view using a small screen size such as typically found in present handheld tablet computing or smartphone devices. The support structure 626 may provide a fixed mounting for a pair of lenses 622 held in relation to the display screen 612. The lenses may be configured to enable the user to comfortably focus on the display screen 612 which may be held approximately one to three inches from the user's eyes.

The device 600 may further include a viewing shroud (not shown) coupled to the support structure 626 and configured of a soft, flexible or other suitable opaque material for form fitting to the user's face and blocking outside light. The shroud may be configured to ensure that the only visible light source to the user is the display screen 612, enhancing the immersive effect of using the device 600. A screen divider may be used to separate the screen 612 into independently driven stereoscopic regions, each of which is visible only through a corresponding one of the lenses 622. Hence, the immersive VR stereoscopic display device 600 may be used to provide stereoscopic display output, providing a more realistic perception of 3D space for the user. Two separate displays can also be used to provide independent images to the user's left and right eyes respectively. It should be appreciated that the present technology may be used for, but is not necessarily limited to, stereoscopic video output.

The immersive VR stereoscopic display device 600 may further comprise a bridge (not shown) for positioning over the user's nose, to facilitate accurate positioning of the lenses 622 with respect to the user's eyes. The device 600 may further comprise an elastic strap or band 624, or other headwear for fitting around the user's head and holding the device 600 to the user's head.

The immersive VR stereoscopic display device 600 may include additional electronic components of a display and communications unit 602 (e.g., a tablet computer or smartphone) in relation to a user's head 630. A support structure 604 holds the display and communications unit 602 using restraining device 624 that is elastic and/or adjustable to provide a comfortable and secure snug fit, for example, adjustable headgear. When wearing the support 602, the user views the display 612 though the pair of lenses 622. The display 612 may be driven by the Central Processing Unit (CPU) 602 and/or Graphics Processing Unit (GPU) 610 via an internal bus 616. Components of the display and communications unit 602 may further include, for example, a transmit/receive component or components 618, enabling wireless communication between the CPU and an external server via a wireless coupling. The transmit/receive component 618 may operate using any suitable high-bandwidth wireless technology or protocol, including, for example, cellular telephone technologies such as 3rd Generation Partnership Project (3GPP) Long Term Evolution (LTE), Global System for Mobile communications (GSM) or Universal Mobile Telecommunications System (UMTS), and/or a wireless local area network (WLAN) technology for example using a protocol such as Institute of Electrical and Electronics Engineers (IEEE) 802.11. The transmit/receive component or components 618 may enable streaming of video data to the display and communications unit 602 from a local or remote video server, and uplink transmission of sensor and other data to the local or remote video server for control or audience response techniques as described herein.

Components of the display and communications unit 602 may further include, for example, one or more sensors 614 coupled to the CPU 606 via the communications bus 616. Such sensors may include, for example, an accelerometer/inclinometer array providing orientation data for indicating an orientation of the display and communications unit 602. As the display and communications unit 602 is fixed to the user's head 630, this data may also be calibrated to indicate an orientation of the head 630. The one or more sensors 614 may further include, for example, a Global Positioning System (GPS) sensor indicating a geographic position of the user. The one or more sensors 614 may further include, for example, a camera or image sensor positioned to detect an orientation of one or more of the user's eyes. In some embodiments, a cameras, image sensor, or other sensor configured to detect a user's eyes or eye movements may be mounted in the support structure 626 and coupled to the CPU 606 via the bus 616 and a serial bus port (not shown), for example, a Universal Serial Bus (USB) or other suitable communications port. The one or more sensors 614 may further include, for example, an interferometer positioned in the support structure 604 and configured to indicate a surface contour to the user's eyes. The one or more sensors 614 may further include, for example, a microphone, array or microphones, or other audio input transducer for detecting spoken user commands or verbal and non-verbal audible reactions to display output. The one or more sensors may include, for example, electrodes to sense heart rate, a temperature sensor configured for sensing skin or body temperature of the user, or other medical sensors for collecting biofeedback data.

While FIG. 6 diagrams an example of a VR device, it should be appreciated that immersive AR devices may include similar electronic components, except for the display output components. The processor and memory of an AR device will also differ in the software that is operated; VR software is configured to drive a VR output device, while AR software is configured to drive an AR output device. A VR output device may comprise a display screen such as, for example, a conventional LCD or OLED screen that is positioned in the VR headset so as to obscure the user's view of anything except what is displayed on the display screen. In contrast, an AR output device does not obscure the user's view of her surroundings.

Several types of AR output devices are commercially available or under development. On one class of devices, a display screen includes a two-dimensional array of pixels that are either set to a first state in which the pixels are transparent or a second state in which the pixels are opaque. The display screen is worn by the user and positioned such that groups of pixels set to the opaque state display a virtual image, while adjacent pixels transmit the external scene. This results in the virtual image being overlain in the scene, from the user's point of view. In another class of devices, a computer-generated image is projected onto a semitransparent screen or lens that is worn in a manner similar to the VR headset described above. The screen or lens is made of a one-way transmissive material that passes light from one side and reflects from the other direction in one or more layers. Light for forming the augmented reality image is projected from a DLP or the like from one or more emitters placed near the user inside of the headset. In a third class of AR devices, one or more video cameras mounted on the headset capture the external scene nearly as the user would see it were the view not blocked by a fully opaque screen in the headset, and combine video from the cameras with computer-generated content in real time to create an augmented display. In a fourth type of device, a laser projector or projector mounted to the user's head and directed to the user's eyes projects images directly on the user's eyes, making the retinas the only screen on which the augmented content is displayed. Examples of devices for immersive and non-immersive AR output include the Hololens™ device under development by Microsoft™ Corporation, Google Glass™ by Google Inc., Digital Lightfield™ by Magic Leap, Inc. of Florida; Space Glasses™ by Meta Company of Portola Valley, Calif., and castAR™ glasses by of castAR or Palo Alto, Calif.

For immersive VR/AR or similar output modalities, the story content of a movie or the like may be enhanced, without eliminating the essence of scripted entertainment that a participant or user (who is visually, aurally and cognitively immersed) can more or less passively enjoy. For example, allowing users to move the viewpoint to see items occluded in the main view as a scene unfolds may enable such users to absorb dramatic details that enhance understanding of the plot, add emotional impact, foreshadow events to come, or otherwise enhance enjoyment of a scripted storyline. An example of foregoing is enhancing story telling by user-selected depth of focus about feedback loops among an interactive VR narrative (or whatever form the narrative takes), and at least two sense modalities plus one cognitive item. These modalities may supplement rather than replace conventional cinema viewing techniques, such that some patrons may view a conventional on-screen version of the same feature, while other patrons who desire a more immersive experience can wear immersive headgear in the same theater as the conventional patrons and contemporaneously enjoy access to the supplemental immersive features.

Sensor data from the one or more sensors may be processed locally by the CPU to control display output, and/or transmitted to a server for processing by the server in real time, or for non-real time processing. As used herein, "real time" refers to processing responsive to user input that controls display output without any arbitrary delay; that is, that reacts as soon as technically feasible. "Non-real time" refers to batch processing or other use of sensor data that is not used to provide immediate control input for controlling the display, but that may control the display after some arbitrary amount of delay.

Components of the display and communications unit 602 may further include, for example, an audio output transducer 620, for example a speaker or piezoelectric transducer in the display and communications unit 602 or audio output port for headphones or other audio output transducer mounted in headgear 624 or the like. The audio output device may provide surround sound, multichannel audio, so-called 'object oriented audio', or other audio track output accompanying a stereoscopic immersive VR video display content. Components of the display and communications unit 602 may further include, for example, a memory device 608 coupled to the CPU 606 via a memory bus. The memory 608 may store, for example, program instructions that when executed by the processor cause the apparatus 600 to perform operations as described herein. The memory 608 may also store data, for example, audio-video data in a library or buffered during streaming operations. Further details regarding generation and use of VR environments may be as described in U.S. Provisional Patent Application Ser. No. 62/088,496, filed Dec. 5, 2014, which is incorporated herein in its entirety by reference.

Figure 7:
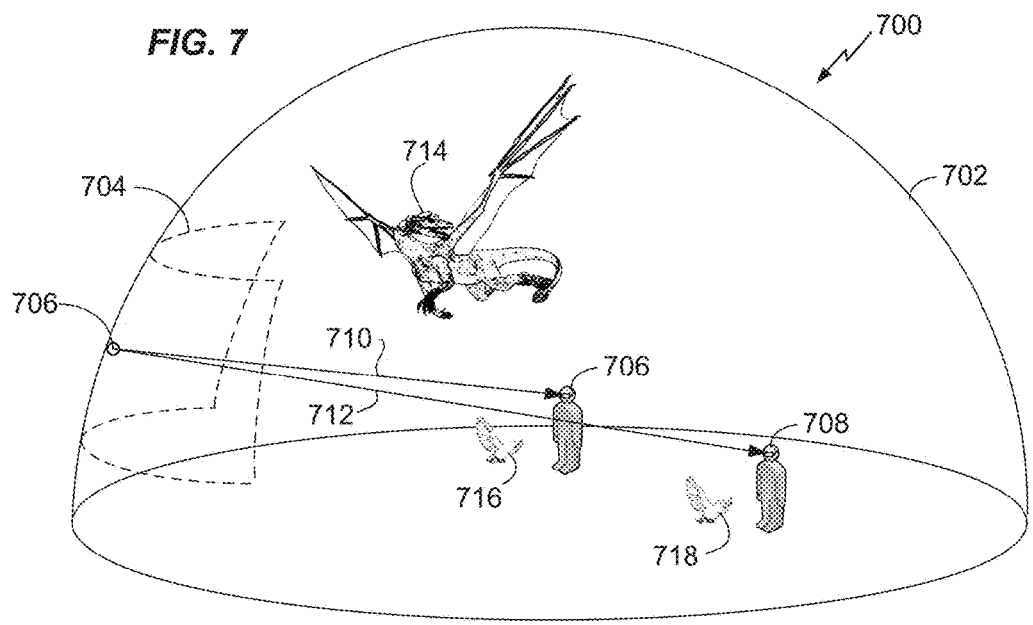
FIG. 7 is a diagram illustrating components of, and concepts concerning, a cinema or home theater space for multi-user VR or AR.

FIG. 7 illustrates geometrical aspect of a display environment 700 for coordinated immersive and non-immersive content, including a real or virtual display screen 704 and a virtual envelope or shell 702 used as a virtual projection surface for rendering the background of a scene in a way that blends smoothly with a projection surface. While shown as a hemispherical dome, it should be appreciated that the shell 702 may be provided in a variety of shapes. Closed curves without sharp edges may be suited for most shell geometries. FIG. 7 shows a bottom edge to the shell 702 for illustrative clarity, but it should be appreciated that transitions between shell surfaces should generally be curved to avoid rendering artifacts. The shell 702 encloses a volume that may be referred to herein as the "view space volume" or similar terminology, in which the action of the scene occurs. It should be appreciated, however, that the shell need not entirely surround the viewer. For example, a shell 702 may extend above or to the sides of a flat display screen without any curvature, may curve towards the audience but not all the way around the audience, or may be untextured and invisible in selected areas.

In implementations using 100% rendered output, use of a shell 702 is optional, because rendering may be based on a model with an infinite extent. However, use of a textured shell may provide the advantage of faster render times and facilitate (by simplifying computations) rendering of the transition area around a 2D screen 704, for AR applications. Background images may be rendered on the shell using simple "ambient" shading, which does not require any raytracing or raytracing approximation for determining surface appearance, except for computing a visible portion of surface from the rendered viewpoint. Instead, each pixel is rendered at a specified color and brightness "baked" into a 2D texture supplied for the geometry shell, based on an aggregate of the 2D texture's pixels that corresponds to a rendered pixel. The level of brightness or white balance of the baked texture may be adjusted in a computationally efficient batch or real-time process to match screen characteristics of a particular theater. The effect may be as if the extent of the display screen were extended over the entire textured portion of the shell 702. Selected portions of the shell 702 may be left untextured and unrendered for any desired reason, for example, for dramatic focus, to manage production costs, or for facility safety. It should be appreciated that a theater may include more than one screen 704, if desired.

The shell 702 does not necessarily coincide with the interior of the theater or room on which the screen 704 exists or in which the viewers 706, 708 are situated. AR output devices are characterized by allowing a user to view her actual environment while overlying the view with objects rendered to as to appear inside the actual environment. Where an AR object is rendered, the actual environment is obscured. Therefore if it is desired to create an illusion that transforms a real object into a rendered object in the AR view, it is necessary to completely obscure the real object with a rendered object. For example, if it is desired to replace a wall of the theater with part of a geometry shell 702 on which a scene background is rendered, the shell needs to obscure the entire wall. However, if the shell is positioned in the AR space beyond the actual wall, the rendered background may not cover the entire wall unless the shell is completely closed. Objects rendered in the view space volume may appear partly against the background, and partly against real structures in the theater, detracting from the intended illusion. If the shell is completely closed and rendered visible, the entire field of view of the user will be a rendered view, and thus, the effect is that of VR and not AR, in the sense that "AR" is used in the present disclosure. Accordingly, for AR output, the shell may be generated to fit inside the viewing room, to avoid diminishing the realism of the immersive AR experience by creating unintended effects such as objects seeming to pass through walls. As such, the shell 702 should exist as an objective feature for AR viewers, meaning it is placed based on the geometry of the viewing screen and room, such that each viewer has a different perspective view of the shell 702 depending on their respective positions in the theater.

For VR output, the shell may extend to any desired dimension and the screen 704 may be virtual, functioning mainly as a sort of focal point 706 or "home" defining a geometrical relationship between the viewer and the intended narrative focal point of a scene. For VR output, the shell may be objectively or subjectively placed, based on user or director preferences. When subjectively placed, each VR viewer may view the shell 702 from the same apparent starting position, which optionally may be varied individually for each used in response to user input. The geometry of the shell 702, and whether it is subjectively or objectively placed, may vary from scene to scene based on the dramatic objectives for each scene. These factors would usually be static for the duration of particular scenes. Transitions between shells of different shapes, and transitions between objective or subjective viewpoints of an object, are permitted and may be abrupt or gradual. A gradual transition may be implemented using an algorithm to generate a series of intermediate shapes or viewpoints bridging between the desired endpoints.

Each scene may have a static focal point 706, which in the case of a physical screen would remain fixed from scene to scene. While the screen 704 is shown as highly curved, it should be appreciated that actual physical screens will usually have much less curvature, or no curvature. When a screen is flat or less curved, the shell 702 may be blended to match the curvature or flatness of the physical screen around its edges, if necessary. The shape of the screen 704 should be expected to vary from theater to theater. To enable use of the same content with screens and theaters of different sizes, a custom or semi-custom (meaning selected from a range of standard shapes and sizes) shell may be selected for each theater, and the custom or semi-custom shell excluding the screen 704 area textured and rendered at runtime based on a background texture file for the shell and the field of view of each viewer. For example, for each viewer, the server may select and transmit a portion of the background texture based on the current viewer field of view, plus some amount of additional area beyond the current field of view to accommodate an expected amount of head movement (which could be very slight, or vary depending on the speed by which principal objects are moving through the scene). Thus, each immersive output device need not be supplied with the entire background texture for every frame, if the background is changing from frame to frame. If the background or a portion thereof is static over several frames, it may be less resource-intensive to supply every immersive output device with the entire background texture or the static portion for the set of frames, instead of selecting a currently viewed portion for individual viewers.

In AR-coordinated viewings, the screen 704 essentially acts as a sort of dynamic background that changes in virtually every frame, but this portion of the output need not be supplied to the AR output device, because it is directly visible to the viewer. The surrounding background portion may be static or dynamic, depending on the scene. Also, the supplemental background placed on the shell 702 need not be supplied in every scene, whether for dramatic effect, to manage production costs, or for other reasons. For some scenes, the supplemental background may be limited to a relatively small portion adjacent to the screen 704, or may be entirely omitted. In general, if supplemental content is to be provided only for certain times of the performance, a visible or audible cue may be provided in advance of each such time, to alert viewers to activate their immersive output devices.

A geometrical relationship between the objective geometry for any given scene and each viewer wearing AR or VR gear may be defined by a vector 710, 712 from a fixed focal point 706 (e.g., a point at the center of the display screen) and each viewer, assuming that the viewer is gazing at the focal point so the view plane of the immersive device is perpendicular to each of the respective vectors 710, 712. Accordingly, to calibrate immersive output devices at the beginning of a showing, the audience members wearing immersive gear may be instructed to gaze at a focal point 706 shown on screen, or several different points in turn, while each person's immersive head gear records a position and orientation of the gaze point. In addition, audience members may be instructed to perform other movements while position and orientation measurements are similarly taken and recorded by each person's immersive head gear. Optionally, individualized adjustments in brightness and white point may similarly be facilitated by measuring a white point and brightness of one or more screen areas, using a light sensor on each person's immersive head gear. The recorded measurement data may then be used to calculate an individualized viewpoint location, orientation and lighting parameter adjustment for each audience member wearing immersive gear. The system server may then record the location and base orientation for each viewer, or each immersive output device may record its own location and orientation relative to the theater's objective coordinate system, or both.

As already noted, the position of off-screen rendered objects may be specified using an objective coordinate system, for example a coordinate system having an origin at the focal point 706 or other location, and defined by set of coordinate axes from that origin. The flying dragon 714 provides an example of an objectively located off-screen object, for which each user's perspective is different. For example, if the objective coordinates for the dragon 714 indicate a position near the center of the view space volume, each user's immersive output device will output a rendering of the dragon positioned in the center of the theater. A user 706 positioned towards the right of the theater will see the dragon 714 to her left, while another user 708 positioned towards the left of the theater will see the dragon 714 to her right. In addition, off-screen objects may be specified relative to each user, based on respective subjective coordinate systems defined by each user's equipment during a calibration sequence. The birds 716, 718 provide examples of subjectively located off-screen objects, the position and orientation of which are specified in coordinates relative each viewer. Accordingly both users will see their respective subjective off-screen objects (e.g., birds 716, 718) in the same position and orientation relative to themselves. It should be appreciated that user 706 will see bird 716 only, and not any other instance of the same subjective object, and likewise user 708 will see only her respective object 718. Whether or not a set of object coordinates is subjective or objective may be indicated by a bit flag. For example, objective coordinates may be indicated by a '1' value and subjective coordinates by a '0' value of the flag bit, or vice-versa, for one or more coordinate sets.

Figure 8A:
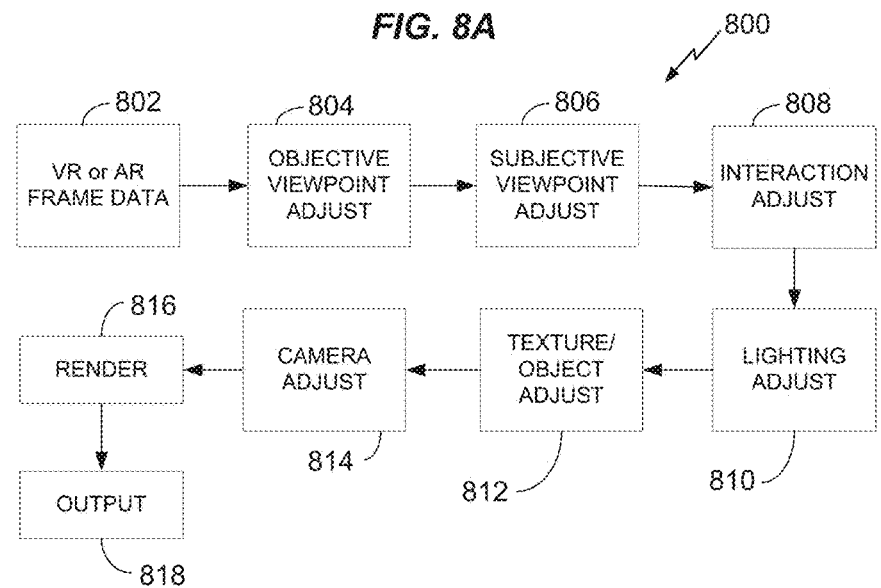
FIG. 8A is a flow chart illustrating elements of serving VR or AR data to an AR or VR output device providing a cinema experience.

Various adjustments to rendering parameters for immersive data may be applied between the common "standard" content source (e.g., digital cinematic master data) and the individualized rendering process by each user. FIG. 8A illustrates elements of a computer-implemented process 800 for making such adjustments. Any one or all of the illustrated elements of the process 800 may be individually performed by each user's immersive output equipment, or (except for output of rendered immersive content) by a cinema server or network. Initially, at 802, immersive data in digital cinematic master data is obtained from any suitable data source and decrypted to obtain frame rendering parameters for each frame or set of frames. Such parameters may include, for example, shell objects and off screen objects appearing in the scene, position and orientation of all objects to be rendered each associated with a set of position and orientation coordinates that are indicated as subjective or objective, associated object textures for rendered objects, lighting parameters, and camera parameters. Standard frame rendering parameters may then be adjusted for each frame or for sets of multiple contiguous frames, as necessary.

These adjustments may include, at 804, transforming objective coordinates for indicated objects to the coordinate system used by the applicable render engine for rendering a viewpoint. Generally, the transform 804 will transform an object's objective coordinates into the coordinates used by the applicable render engine for rendering immersive output for a particular immersive output device. The applicable render engine may be located variously, such as in a random access memory of an immersive device, in a local auxiliary device for the immersive output device, in a cinema server or server farm, or in a cloud computing resource. In any case, the coordinate transform will be based on the coordinates used by the render engine and calibration data establishing the geometrical relationship between each member of the audience and the theater's objective coordinates. Any suitable transform method as known in the art may be used for the coordinate transform.

The adjustments may further include, at 806, transforming subjective coordinates for indicated objects to the coordinate system used by the applicable render engine for rendering a viewpoint. In the trivial case, no transformation is needed because the common subjective values will work for every render engine, and are the same for every audience member. However, in some cases certain transformation may be needed to put subjective coordinates in proper condition for rendering, for example converting to a different type of coordinate system to facilitate a particular render engine or adding a fixed offset value to account for physical differences between users.

The adjustments may further include, at 808, adjusting a position or orientation of rendered objects based on user input, in the case of interactive objects. The appearance, position, or orientation of selected objects may depend on user input. The influence of user input may be limited to specified objects and ranges of change, to prevent disrupting the flow of a narrative performance and maintain contemporaneous audience members in sync.

The adjustments may further include, at 810, adjusting scene lighting parameters. In an aspect, position and orientation of scene lights may be designated objective or subjective, and transformed as needed like any other off screen object with respect to position and orientation coordinated. In addition, other lighting parameters, such as intensity or color, may also be adjusted so that the brightness and color of rendered scene elements matches the brightness and color of output on the theater's display screen.

The adjustments may further include, at 812, adjusting object texture, for example, applying an automatic level of detail based on a distance between the rendered viewpoint and each rendered object, or equivalent measure. Automatic level of detail provides less detailed texture maps for more distant objects, to improve rendering performance. Similarly, automatic level of detail adjustments may be used to select a mesh density for off screen objects based on distance from the viewpoint, again for rendering efficiency.

The adjustments may further include, at 814, adjusting camera parameters other than position and orientation, such as focal point, field of field, and aperture, based on immersive input. Hence, an immersive render engine may allow a user to "zoom in" or "zoom out" on the scene, with appropriate camera adjustments. In AR mode with a common display screen, such camera zoom may cause mismatch between the display screen 704 and rendered shell 702 or off screen objects 714, 716, 718, and might be limited to rendering of views that exclude the display screen only. Once adjustments are made the render engine may render the scene at 816 and the rendered data may be displayed using an immersive output device at block 818.

In a theater environment with seated patrons, the location of each viewer may be relatively static, but the orientation of the viewer's head will vary throughout the show. The cinema distribution server may track locations and/or orientation data for managing consumption of bandwidth as mentioned above, or may ignore position and orientation information if the theater's information system can support the provision of full immersive environmental information to each user for every frame. If the bandwidth of the information system is sufficiently broad, and the computational power of the individual output devices is sufficiently high to render all immersive features in every frame, all computation of the individual views may be performed at the respective immersive output devices. Assuming present trends in computing power and transmission bandwidth continue, it is likely that location and orientation tracking by a distribution server may at some point become unnecessary, unless for gathering statistical viewer metrics. In the interim, computational power may need to be allocated to the server side, for tasks such as managing bandwidth or providing high speed, high quality rendering in real time.

In another alternative embodiment 850 illustrated by FIG. 8B, an immersive and non-immersive content may be downloaded or otherwise provided to a plurality of dedicated memory devices 858A, 858B, each of which is attached to a respective one of the immersive output devices 856A, 856B via a high-bandwidth connection, such as, for example, a high-speed Universal Serial Bus (USB) or Serial Advanced Technology Attachment (SATA) connection. Each of the memory devices 858A, 858B may be incorporated into the immersive output devices 856A, 856B, or installed in the theater and connected to the immersive output devices 856A, 858B via a cable port at each chair and a corresponding one of the render control units 852A, 852B. The render units 852A, 852B may each be implemented to optimize efficiency and comfort depending on available technology, for example in a random access memory or specialized graphics hardware subsystem of an immersive device, in a locally sited auxiliary hardware and software component for the immersive output device (e.g., under a cinema seat), in a cinema server or server farm, or in a cloud computing resource. Each one of the render control units 852A, 852B may obtain the content from a respective one the memory devices 858A, 858B based on sensor data from a corresponding one of the immersive output devices 856A, 856B. The pace of the performance for the cinema system 850 may be controlled and coordinated between different audience members and a 2D display screen 870 by a signal from a cinema server 872, for example a wireless signal, generated by a coordination module 878. In these embodiments, content data is provided to each immersive output device via respective high-bandwidth bus connections while control signals used for coordinating the program over all the audience can be provided in real time over a lower bandwidth wired or wireless interface. The content data 864, 866, 862 may be stored in encrypted form subject to a security system module 880 that only allows access during the theater presentation or at other authorized times. AR data 864 may be rendered for the AR output device 854A and VR data 866 may be rendered for the VR output device 854B. Sensor data from user input devices 856A, 856B may primarily be used to control rendering by the rendering units 852A, 852B and secondarily may be provided to a metrics component 882 for tracking aggregate audience reactions to immersive content. A communications software component 876 may be used to manage communications between render units 852A, 852B and server 872, immersive output devices 854A, 854B and other system components. Likewise an administrative software component 868 may manage overall system operation at server 872.

Although relieving bandwidth constraints on providing content data, providing the content over a bus may solve only half of the resource problem. Present graphics processors for rendering cinematic-quality, high resolution images in real time may have power consumption and space requirements that make them unsuitable for incorporating into wearable, mobile computing equipment. Hence, cinema-side implementations with high bandwidth connections, for example render management units 852A, 852B implemented local to cinema seating may offer a feasible solution to the intensive rendering demands of high-quality immersive content, in the near term. As graphics rendering technology improves, these units may be upgraded periodically to more capable processors with lower power requirements, and eventually phased out when mobile, battery powered processors are powerful enough to handle the processing load. In the alternative, or in addition, very high bandwidth communications technology and improved image compression technology may permit rendering to be offloaded to cloud-implemented rendering units.

In another aspect, immersive content may be used to supplement non-immersive content in a non-contemporaneous performance method 900, as illustrated by FIG. 9. As indicated at block 902, 2D (or stereographic 3D) content may be played for projection or other conventional 2D screen display, without accompanying immersive play. As an immersive play segment approaches, at 904, some signal may be provided to audience members that possess immersive output equipment that an immersive segment is imminent. For example, text or graphics may be included in the screen display, or the audience immersive output devices automatically turned on. At 906, optionally the 2D play may be paused or set to an "immersive intermission" mode. In an alternative, the 3D play may continue contemporaneously. At 908, the cinema system may enable and cause immersive output in any suitable manner, as described herein. At 910, when the immersive segment is finished, the cinema system may disable immersive play and revert to the 2D performance only at 902.

In view the foregoing, and by way of additional example, FIGS. 10-12 show aspects of a method or methods for providing contemporaneous immersive and non-immersive play in a cinema or home theater, as may be performed by a home or cinema server or other computing apparatus described herein. Referring to FIG. 10, a computer-implemented method 1000 may include, at 1010, communicating with multiple immersive output devices each configured for providing one of an augmented reality (AR) output or a virtual reality (VR) output based on a data signal, wherein each of the multiple immersive output devices is present within eyesight of a 2D display screen located in a room, such as in a home theater or commercial cinema. The communicating may be performed by any one or more of a cinematic data distribution server, a home distribution server, or a network of dedicated immersive rendering units. The method may include, at 1020, configuring the data signal based on digital cinematic master data that includes at least one of VR data or AR data. The method may include, at 1030, transmitting the data signal to the multiple immersive output devices contemporaneously with each other, while in the eyesight of the display screen.

The method 1000 may include any one or more of additional operations 1100, 1200 or 1300, shown in FIGS. 11, 12 and 13, in any operable order. Each of these additional operations is not necessarily performed in every embodiment of the method, and the presence of any one of the operations 1100, 1200 or 1300 does not necessarily require that any other of these additional operations also be performed.

Referring to FIG. 11, the method 1000 may further include, at 1110, outputting an image based on a video data portion of the digital cinematic master data on the display screen, contemporaneously with the transmitting. As noted in connection with FIG. 9, display on the 2D display screen may also be performed non-contemporaneously with immersive output.

In another aspect, the method 1000 may further include, at 1120, including the AR data in the data signal, augmenting video data output on the display screen. Augmenting may include, at 1130, configuring the data signal so when received by the multiple immersive output devices, images on the display screen are continuously extended to areas beyond an outer limit of the display screen, for each person viewing immersive output on one of the multiple immersive output devices. In another aspect, augmenting may include, at 1140, including in the AR data code (e.g., program instructions or parameters) for managing a transition between AR output produced from the AR data by an AR output device and video output shown on the display screen, based at least in part on a geometry of the display screen and a relative position of each person viewing AR output on one of the multiple immersive output devices.

Referring to FIG. 12, the method 1000 may further include, at 1210, configuring the data signal so that when received by the multiple immersive output devices, images that do not appear on the display screen are caused to appear as if located in or around a view space volume to each person viewing immersive output on one of the multiple immersive output devices. For example, the immersive data may cause an off screen object or background shell to be rendered and output, as described in connection with FIG. 7. In another aspect, the method 1000 may further include, at 1220, configuring the data signal so that the images that do not appear on the display screen appear in a coordinate system defined relative to the each person viewing immersive output on one of the multiple immersive output devices (i.e., in subjective coordinates as described in connection with FIG. 7). In addition, or in the alternative, the method 1000 may further include, at 1230, configuring the data signal so that the images that do not appear on the display screen appear in a coordinate system defined relative to the display screen (i.e., in objective coordinates as described in connection with FIG. 7).

In another aspect, the method 1000 may further include, at 1240, including in the data signal code enabling each person viewing immersive output on one of the multiple immersive output devices to interact with at least one of the images that do not appear on the display screen, causing immersive output to change, as further described in connection with FIG. 8A. In an alternative, or in addition, the method may include, at 1250, changing video output shown on the display screen based on the each person's interaction with at least one of the images. For example, conditional video sequences may be prepared for certain scenes to be played on the 2D screen, and the sequence to be shown on the 2D theater screen selected by the cinema server based on the interactions of one or more audience members with an immersive, off-screen object. Thus, audience members may enjoy a sensation of influencing not only their own immersive experience, but also the non-immersive shared experience.

In another aspect, the method 1000 may further include, at 1260, providing an electronic record of a license right to digital content (e.g., a digital certificate) to a user account data store associated with the each person, based the each person's interaction with at least one of the images. Thus, audience members may enjoy the sensation of earning a right to use digital content in other applications (for example, in a video game or social media application) based on interactions with an off-screen immersive object. For example, if watching an immersive cinema presentation of Lord of the Rings, an audience member who possesses a license to a Lord of the Rings video game may be provided with opportunities to "pick up" certain off-screen immersive objects useful in the video game, while watching the immersive presentation. If, for example, the audience member interacts with an off-screen immersive weapon by "picking it up" or the like, the interaction may be recorded and transmitted to a game server for the Lord of the Rings game, which then releases an in-game representation of the weapon in the member's game account. When the user returns home and logs into the game server, the weapon is there and ready to be used in game play. In another aspect, the data store may be or include a computer memory in an AR or VR output device worn by the audience member (i.e., "the each person"). In these embodiments, no transmission to a remote game server is required. The acquired license may be immediately used in a game that operates on the VR or AR output device or in any computer authorized to connect to the VR or AR output device and access the certificate of license right stored there.

Referring to FIG. 13, the method 1000 may further include, at 1310, including the VR data for augmenting video data for output on the display screen. In a related aspect, the method 1000 may include, at 1320, playing the video data and the VR data at different, non-overlapping times, such that ones of the multiple persons wearing a VR output device view content on the display screen and on a VR output device at different times. In addition, or in the alternative, the video data and the VR data are configured to play contemporaneously.

In another aspect, the method 1000 may include, at 1340, including haptic control data in the digital cinematic master data, where the haptic control data activates a haptic device in coordination with the at least one of AR data or VR data. Further details may be as described in connection with FIG. 5B above.

Figure 14:
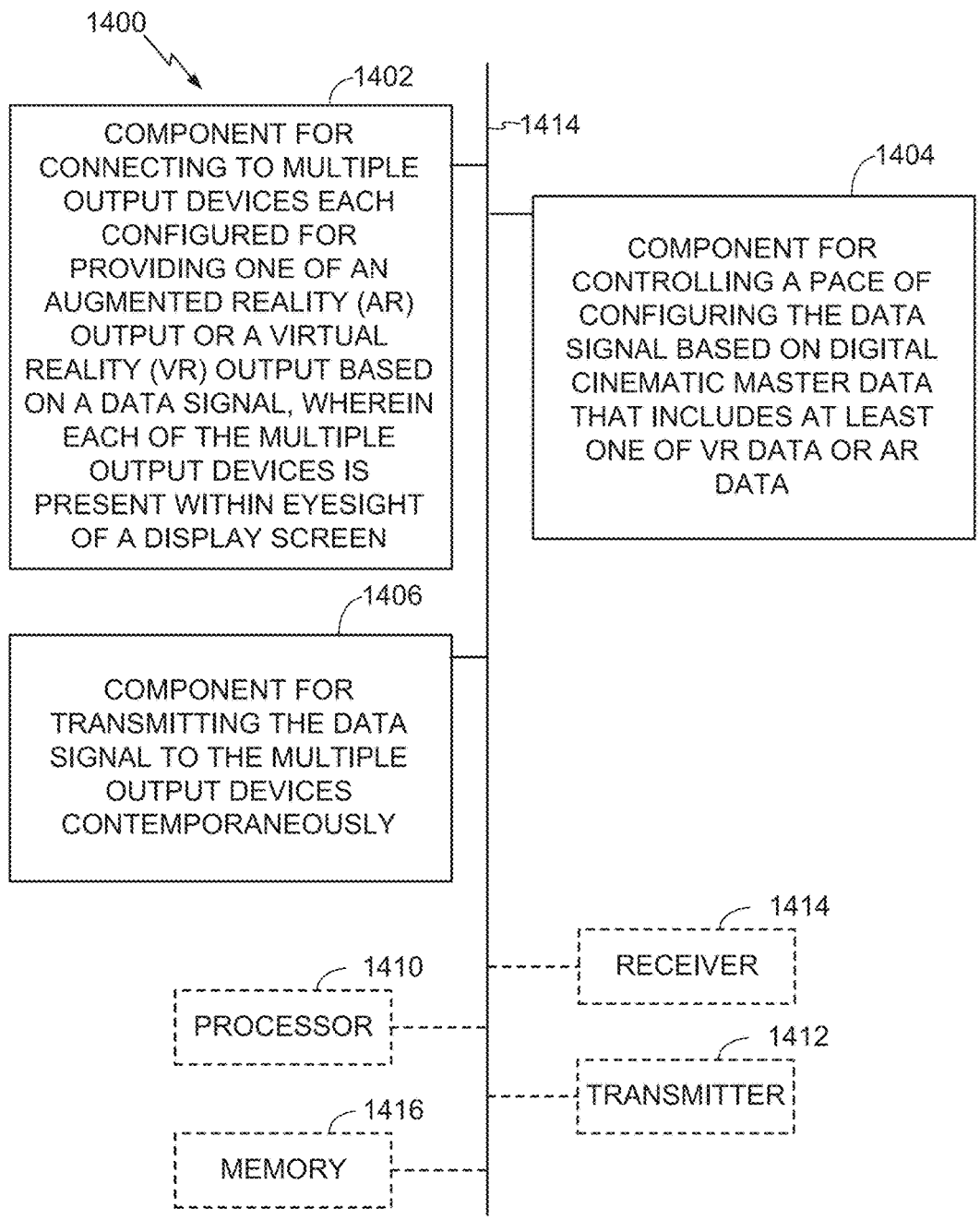
FIG. 14 is a conceptual block diagram illustrating components of an apparatus or system for serving VR or AR data to an AR or VR output device providing a cinema experience.

FIG. 14 is a conceptual block diagram illustrating components of an apparatus or system 1400 for providing contemporaneous immersive and non-immersive play in a cinema or home theater, as described herein. The apparatus or system 1400 may include additional or more detailed components for performing functions or process operations as described herein. For example, the processor 1410 and memory 1416 may contain an instantiation of an immersive content transformation process as described herein above. As depicted, the apparatus or system 1400 may include functional blocks that can represent functions implemented by a processor, software, or combination thereof (e.g., firmware).

As illustrated in FIG. 14, the apparatus or system 1400 may comprise an electrical component 1402 for communicating with multiple immersive output devices each configured for providing one of an AR output or a VR output based on a data signal, wherein each of the multiple immersive output devices is present within eyesight of a display screen. The component 1402 may be, or may include, a means for the communicating. Said means may include the processor 1410 coupled to the memory 1416, the receiver 1414, and to the transmitter 1414, the processor executing an algorithm based on program instructions stored in the memory. Such algorithm may include a sequence of more detailed operations, for example, establishing a plurality on concurrent data sessions with a corresponding plurality of the multiple immersive output devices, authenticating the multiple immersive output devices, establishing a concurrent data session with a 2D display device, authenticating the 2D display device, and confirming that a content package for a performance is authorized for play by the multiple immersive output devices and by the 2D display device. Said means may also include, or in the alternative include, components of the systems 400, 850 described above in connection with FIGS. 4 and 8B.

The apparatus 1400 may further include an electrical component 1404 for configuring the data signal based on digital cinematic master data that includes at least one of VR data or AR data. The component 1404 may be, or may include, a means for configuring the data signal based on digital cinematic master data that includes at least one of VR data or AR data. Said means may include the processor 1410 coupled to the memory 1416, the processor executing an algorithm based on program instructions stored in the memory. Such algorithm may include a sequence of more detailed operations, for example, any one or more of the operations described in connection with FIGS. 11-13 that relate to configuring a data signal.

The apparatus 1400 may further include an electrical component 1406 for transmitting the data signal to the multiple immersive output devices contemporaneously. The component 1406 may be, or may include, a means for transmitting the data signal to the multiple immersive output devices contemporaneously. Said means may include the processor 1410 coupled to the memory 1416, the receiver 1414, and to the transmitter 1414, the processor executing an algorithm based on program instructions stored in the memory. Such algorithm may include a sequence of more detailed operations, for example, selecting a transmission medium including at least a wireless medium or a wired medium, selecting a communication protocol for the transmission medium, and transmitting the data signal according to the communication protocol.

The apparatus 1400 may optionally include a processor module 1410 having at least one processor, in the case of the apparatus 1400 configured as a data processor. The processor 1410, in such case, may be in operative communication with the modules 1402-1406 via a bus 1412 or similar communication coupling. The processor 1410 may effect initiation and scheduling of the processes or functions performed by electrical components 1402-1406.

In related aspects, the apparatus 1400 may include a network interface module (not shown) operable for communicating with system components over a computer network. In further related aspects, the apparatus 1400 may optionally include a module for storing information, such as, for example, a memory device 1416. The computer readable medium or the memory module 1416 may be operatively coupled to the other components of the apparatus 1400 via the bus 1412 or the like. The memory module 1416 may be adapted to store computer readable instructions and data for effecting the processes and behavior of the modules 1402-1406, and subcomponents thereof, or the processor 1410, or the method 1000 and one or more of the additional operations 1100, 1200 or 1300 disclosed herein. The memory module 1416 may retain instructions for executing functions associated with the modules 1402-1406. While shown as being external to the memory 1416, it is to be understood that the modules 1402-1406 can exist within the memory 1416.

The apparatus 1400 may include a transmitter 1412 configured as a wireless transmitter, or a wired transmitter, for transmitting a communication signal to a VR output device, an AR output device, or another system component such as, for example, the rendering units shown in FIG. 8B or the cinema server shown in FIGS. 4 and 8B. In addition, the apparatus 1400 may include a receiver 1414 for receiving a communication signal from a VR output device, an AR output device, or another system component such as, for example, the rendering units shown in FIG. 8B or the cinema server shown in FIGS. 4 and 8B. The receiver 1414 may comprise a wireless receiver, or a wired receiver.

Figure 15:
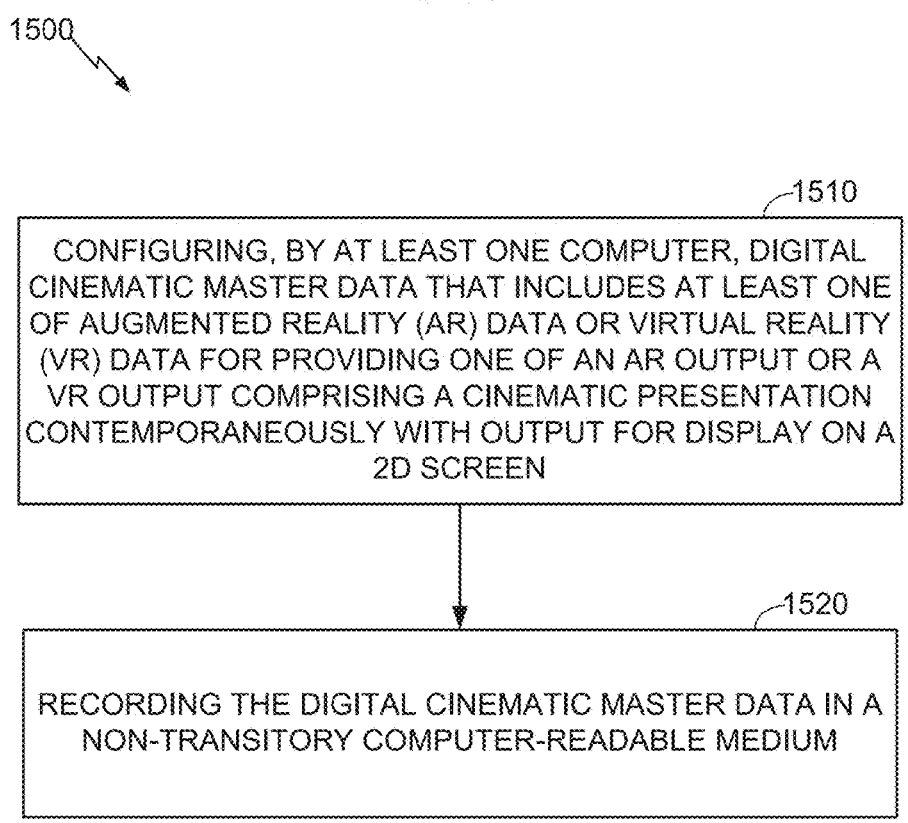
FIG. 15 is a flow chart illustrating a method for configuring digital cinematic master data for a cinematic presentation.

In view the foregoing, and by way of additional example with respect to preparing digital master data for immersive and non-immersive contemporaneous performance, FIGS. 15-17 show aspects of a method or methods for configuring digital cinematic master data, as may be performed by an production device for VR or AR content or other computing apparatus described herein. Referring to FIG. 15, a method 1400 may include, at 1410, configuring, by at least one computer, digital cinematic master data that includes at least one of augmented reality (AR) data or virtual reality (VR) data for providing one of an AR output or a VR output comprising a cinematic presentation contemporaneously with output for display on a 2D screen. The method 1500 may further include, at 1520, recording the digital cinematic master data in a non-transitory computer-readable medium. Further details of the method 1500 may be consistent with the description above in connection with FIGS. 1 and 4-9.

The method 1400 may include any one or more of additional operations 1600 or 1700, shown in FIGS. 16 and 17, in any operable order. Each of these additional operations is not necessarily performed in every embodiment of the method, and the presence of any one of the operations 1600 or 1700 does not necessarily require that any other of these additional operations also be performed.

Referring to FIG. 16, the method 1500 may further include, at 1610, preparing the AR data for augmenting video data configured for projection or output on the 2D display screen arranged for viewing by multiple individuals. The data for output on the 2D screen may be configured for one or more of stereoscopic 3D output, or 2D output. The method 1500 may further include, at 1620, preparing the AR data for continuously extending images on the display screen to areas beyond an outer limit of the display screen. Examples of continuous extension are described above in connection with FIGS. 3 and 7. The method 1500 may further include, at 1630, preparing the AR data for causing images that do not appear on the display screen to appear as if located in or around a non-screen display volume to any one of the multiple individuals wearing an AR output device. For example, the data may be prepared for display of off screen objects or geometry shells as described in connection with FIGS. 3 and 7. The method 1500 may further include, at 1640, preparing the AR data so that the images appear in a coordinate system defined relative to each of the multiple individuals wearing an AR output device (i.e., in a subjective coordinate system). The method 1500 may further include, at 1650, preparing the AR data so that the images appear in a coordinate system defined relative to the display screen (i.e., in an objective coordinate system).

Referring to FIG. 17, the method 1500 may further include, at 1710, including in the AR data code for enabling a user to interact with at least one of the images, causing the AR output to change in response to user input. The method 1500 may further include, at 1720, configuring the code so that a user's interaction with at least one of the images causes the video output shown on the display screen to change. The method 1500 may further include, at 1730, configuring the code so that a user's interaction with at least one of the images causes an electronic record of a license right to digital content to be provided to a user account data store associated with the user. The method 1500 may further include, at 1730, including haptic control data in the digital cinematic master data, where the haptic control data activates a haptic device in coordination with the at least one of AR data or VR data. In other aspects, configuring the cinematic master data may further include performing operations to implement or facilitate any of the more detailed output effects or associated functions described herein above in connection with use of cinematic master data in contemporaneous immersive and non-immersive performances for audiences of multiple persons.

Figure 18:
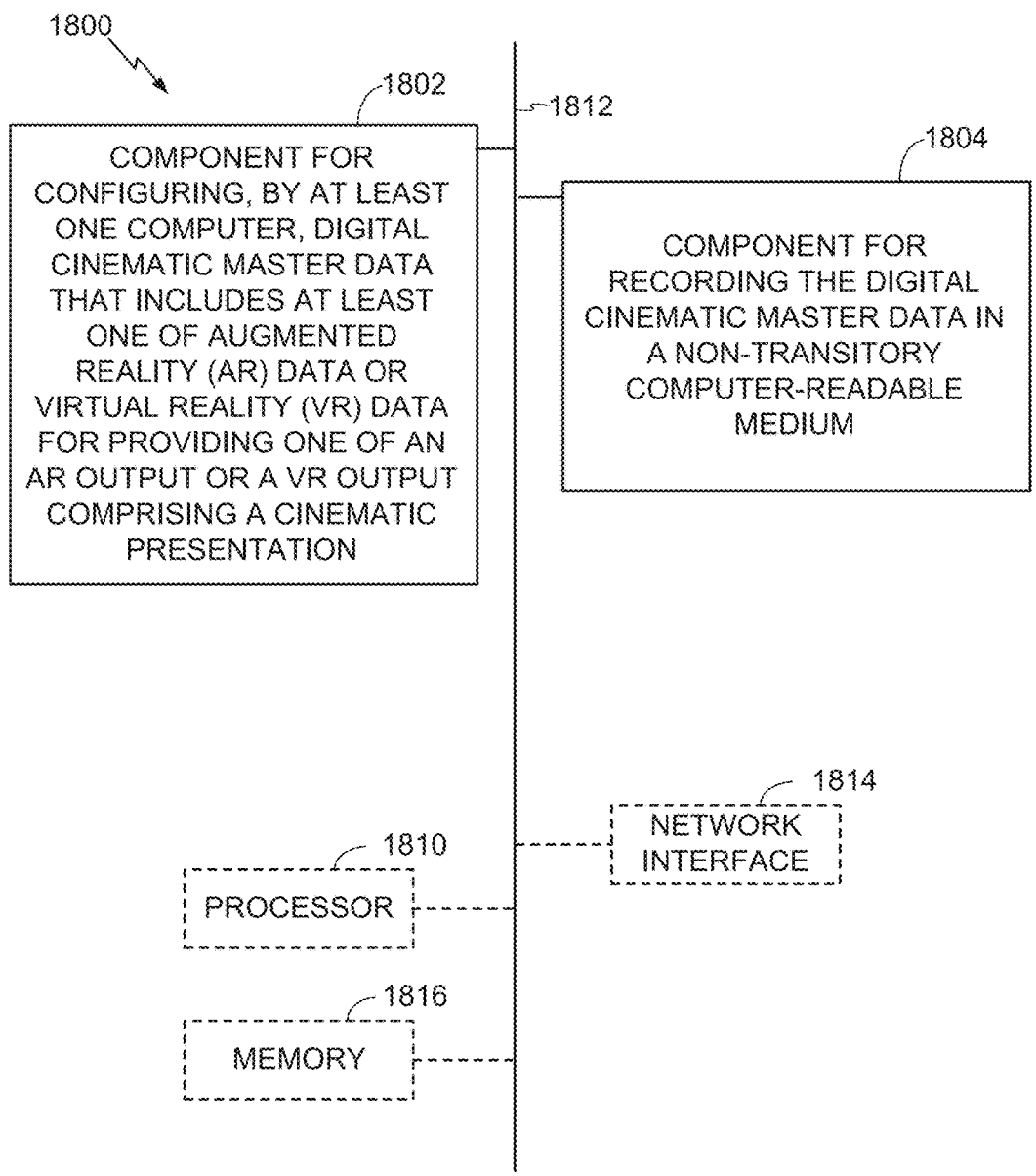
FIG. 18 is a conceptual block diagram illustrating components of an apparatus or system for configuring digital cinematic master data for a cinematic presentation.

FIG. 18 is a conceptual block diagram illustrating components of an apparatus or system 1800 for preparing digital master data for immersive and non-immersive contemporaneous performance as described herein. The apparatus or system 1800 may include additional or more detailed components as described herein. As depicted, the apparatus or system 1800 may include functional blocks that can represent functions implemented by a processor, software, or combination thereof (e.g., firmware).

As illustrated in FIG. 18, the apparatus or system 1800 may comprise an electrical component 1802 for configuring digital cinematic master data that includes at least one of augmented reality (AR) data or virtual reality (VR) data for providing one of an AR output or a VR output comprising a cinematic presentation contemporaneously with output for display on a 2D screen. The component 1802 may be, or may include, a means for configuring VR output data. Said means may include the processor 1810 coupled to the memory 1816, the processor executing an algorithm based on program instructions stored in the memory. Such algorithm may include a sequence of more detailed operations, for example, arranging immersive content, arranging non-immersive content, and defining a set of rules for coordinating output of immersive content by an immersive output device with contemporaneous output of non-immersive content for display on a 2D screen.

The apparatus 1800 may further include an electrical component 1804 for recording the digital cinematic master data in a non-transitory computer-readable medium. The component 1804 may be, or may include, a means for recording the digital cinematic master data in a non-transitory computer-readable medium. Said means may include the processor 1810 coupled to the memory 1816, the processor executing an algorithm based on program instructions stored in the memory. Such algorithm may include a sequence of more detailed operations, for example, selecting an output format for the master data, formatting the master data according to the selected output format, encrypting the formatted master data, and encoding the encrypted and formatted master data in a non-transitory computer-readable medium according to an information storage protocol.

The apparatus 1800 may optionally include a processor module 1810 having at least one processor, in the case of the apparatus 1800 configured as a data processor. The processor 1810, in such case, may be in operative communication with the modules 1802-1804 via a bus 1812 or similar communication coupling. The processor 1810 may effect initiation and scheduling of the processes or functions performed by electrical components 1802-1804.

In related aspects, the apparatus 1800 may include a network interface module 1814 operable for communicating with system components over a computer network. For example, the component 1814 may facilitate distribution of the digital master data to other devices of a communications and/or computer network. In alternative embodiments, the apparatus may include a port to a device for recording the content and alternative content in a non-transitory computer-readable medium. In further related aspects, the apparatus 1800 may optionally include a module for storing information, such as, for example, a memory device/module 1816. The computer readable medium or the memory module 1816 may be operatively coupled to the other components of the apparatus 1800 via the bus 1812 or the like. The memory module 1816 may be adapted to store computer readable instructions and data for effecting the processes and behavior of the modules 1802-1804, and subcomponents thereof, or the processor 1810, or of the method 1500 and one or more of the additional operations 1600 or 1700 disclosed herein, or of operations to implement or facilitate any of the more detailed output effects or associated functions described herein above in connection with use of cinematic master data in contemporaneous immersive and non-immersive performances for audiences of multiple persons. The memory module 1816 may retain instructions for executing functions associated with the modules 1802-1804. While shown as being external to the memory 1816, it is to be understood that the modules 1802-1804 can exist within the memory 1816.

Further aspects of mastering for AR and VR are outlined in the attached appendix.

Those of skill would further appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

As used in this application, the terms "component", "module", "system", and the like are intended to refer to a computer-related entity, either hardware, a combination of hardware and software, software, or software in execution. For example, a component or a module may be, but are not limited to being, a process running on a processor, a processor, an object, an executable, a thread of execution, a program, and/or a computer. By way of illustration, both an application running on a server and the server can be a component or a module. One or more components or modules may reside within a process and/or thread of execution and a component or module may be localized on one computer and/or distributed between two or more computers.

Various aspects will be presented in terms of systems that may include a number of components, modules, and the like. It is to be understood and appreciated that the various systems may include additional components, modules, etc. and/or may not include all of the components, modules, etc. discussed in connection with the figures. A combination of these approaches may also be used. The various aspects disclosed herein can be performed on electrical devices including devices that utilize touch screen display technologies, heads-up user interfaces, wearable interfaces, and/or mouse-and-keyboard type interfaces. Examples of such devices include VR output devices (e.g., VR headsets), AR output devices (e.g., AR headsets), computers (desktop and mobile), smart phones, personal digital assistants (PDAs), and other electronic devices both wired and wireless.

In addition, the various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

Operational aspects disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, DVD, Blu-ray disc, solid-state storage device (SSD) or any other form of storage medium known in the art. An exemplary storage medium is coupled to the processor such the processor can read information from, and write information to, the storage medium. In the alternative, the storage medium may be integral to the processor. The processor and the storage medium may reside in an ASIC. The ASIC may reside in a user terminal. In the alternative, the processor and the storage medium may reside as discrete components in a user terminal.

Furthermore, the one or more versions may be implemented as a method, apparatus, or article of manufacture using standard programming and/or engineering techniques to produce software, firmware, hardware, or any combination thereof to control a computer to implement the disclosed aspects. Non-transitory computer readable media can include but are not limited to magnetic storage devices (e.g., hard disk, floppy disk, magnetic strips . . . ), optical disks (e.g., compact disk (CD), digital versatile disk (DVD), Blu-Ray™, . . . ), smart cards, flash memory devices (e.g., card, stick), and solid-state storage devices. Of course, those skilled in the art will recognize many modifications may be made to this configuration without departing from the scope of the disclosed aspects.

The previous description of the disclosed aspects is provided to enable any person skilled in the art to make or use the present disclosure. Various modifications to these aspects will be readily apparent to those skilled in the art, and the generic principles defined herein may be applied to other embodiments without departing from the spirit or scope of the disclosure. Thus, the present disclosure is not intended to be limited to the embodiments shown herein but is to be accorded the widest scope consistent with the principles and novel features disclosed herein.

In view of the exemplary systems described supra, methodologies that may be implemented in accordance with the disclosed subject matter have been described with reference to several flow diagrams. While for purposes of simplicity of explanation, the methodologies are shown and described as a series of blocks, it is to be understood and appreciated that the claimed subject matter is not limited by the order of the blocks, as some blocks may occur in different orders and/or concurrently with other blocks from what is depicted and described herein. Moreover, not all illustrated blocks may be required to implement the methodologies described herein. Additionally, it should be further appreciated that the methodologies disclosed herein are capable of being stored on an article of manufacture to facilitate transporting and transferring such methodologies to computers.

The invention claimed is:

1. A method for displaying an augmented reality (AR) output or a virtual reality (VR) output at multiple immersive output devices, comprising:
communicating, by a cinematic data distribution server, with multiple immersive output devices each configured for providing one of an AR output or a VR output based on a data signal, wherein each of the multiple immersive output devices is present within eyesight of a shared display screen;
configuring the data signal based on digital cinematic master data that includes at least one of VR data or AR data, wherein the at least one of VR data or AR data enables locating off-screen objects coordinated with a cinematic presentation on the shared display screen, so that at least one of the off-screen objects appears in subjective viewpoints each relative to a different one of the multiple immersive output devices and another of the off-screen objects appears in an objective viewpoint relative to the shared display screen;
providing, by the cinematic data distribution server, textured shell data for use by the multiple immersive output devices as a background portion of the cinematic presentation matching the cinematic presentation on the shared display screen in content and location, wherein the textured shell data includes image data that extends the cinematic presentation beyond boundaries of the shared display screen; and
transmitting the data signal to the multiple immersive output devices contemporaneouslywith displaying the cinematic presentation on the shared display screen coordinated with the off-screen objects.

2. The method of claim 1, further comprising outputting an image based on a video data portion of the digital cinematic master data on the shared display screen, contemporaneously with the transmitting.

3. The method of claim 1, further comprising configuring the data signal so when received by the multiple immersive output devices, images on the shared display screen are continuously extended to areas beyond an outer limit of the shared display screen, for each person viewing immersive output on one of the multiple immersive output devices.

4. The method of claim 1, wherein configuring the data signal includes setting one or more bits of the data signal so that when output by the multiple immersive output devices, whether the off-screen objects that do not appear on the shared display screen appear in the subjective viewpoints or the objective viewpoint to each person viewing immersive output on one of the multiple immersive output devices depends on a set value of the one or more bits.

5. The method of claim 4, wherein any one or more of the off-screen objects appearing in the subjective viewpoints are located by a coordinate system defined relative to the each person viewing immersive output on one of the multiple immersive output devices.

6. The method of claim 4, wherein any one or more of the off-screen objects appearing in the objective viewpoint are located by a coordinate system defined relative to the shared display screen.

7. The method of claim 4, further comprising including in the data signal code enabling each person viewing immersive output on one of the multiple immersive output devices to interact with at least one of the images that do not appear on the shared display screen, causing immersive output to change.

8. The method of claim 7, further comprising changing video output shown on the shared display screen based on the each person's interaction with at least one of the images.

9. The method of claim 7, further comprising providing an electronic record of a license right to digital content to a user account data store associated with the each person, based on the each person's interaction with at least one of the images.

10. The method of claim 9, where the data store comprises a computer memory in an AR output device worn by the each person.

11. The method of claim 1, wherein the configuring comprises including the AR data for augmenting video data for output on the shared display screen.

12. The method of claim 11, further comprising including in the AR data code for managing a transition between AR output produced from the AR data by an AR output device and video output shown on the shared display screen, based at least in part on a geometry of the shared display screen and a relative position of each person viewing AR output on one of the multiple immersive output devices.

13. The method of claim 1, wherein the configuring comprises including the VR data for augmenting video data for output on the shared display screen.

14. The method of claim 13, further comprising playing the video data and the VR data at different, non-overlapping times, such that ones of the multiple individuals wearing a VR output device view content on the shared display screen and on a VR output device at different times.

15. The method of claim 13, wherein the video data and the VR data are configured to play contemporaneously.

16. The method of claim 1, wherein the video data comprises one of two-dimensional non-stereoscopic or stereoscopic frame data.

17. The method of claim 1, further comprising including haptic control data in the digital cinematic master data, where the haptic control data activates a haptic device in coordination with the at least one of AR data or VR data.

18. An apparatus for providing at least one of augmented reality (AR) output or a virtual reality (VR) output for a contemporaneous presentation to a co-located audience, comprising:
a processor, a memory coupled to the processor, and a stereoscopic display device coupled to the processor, wherein the memory holds instructions that when executed by the processor, cause the apparatus to perform:
communicating with multiple immersive output devices each configured for providing one of an augmented reality (AR) output or a virtual reality (VR) output based on a data signal, wherein each of the multiple immersive output devices is present within eyesight of a shared display screen;
configuring the data signal based on digital cinematic master data that includes at least and one of VR data or AR data, wherein the at least one of VR data or AR data enables locating off-screen objects coordinated with a cinematic presentation on the shared display screen, so that at least one of the off-screen objects appears in subjective viewpoints each relative to a different one of the multiple immersive output devices and another of the off-screen objects appears in an objective viewpoint relative to the shared display screen;

providing textured shell data for use by the multiple immersive output devices as a background portion of the cinematic presentation matching the cinematic presentation on the shared display screen in content and location, wherein the textured shell data includes image data that extends the cinematic presentation beyond boundaries of the shared display screen; and transmitting the data signal to the multiple immersive output devices contemporaneously with display of cinematic content on the shared display screen coordinated with the off-screen objects.

* * * * *